United States Patent
Aoki

(10) Patent No.: US 7,986,837 B2
(45) Date of Patent: Jul. 26, 2011

(54) IMAGE PROCESSING APPARATUS, IMAGE FORMING APPARATUS, IMAGE DISTRIBUTING APPARATUS, IMAGE PROCESSING METHOD, COMPUTER PROGRAM PRODUCT, AND RECORDING MEDIUM

(75) Inventor: Shinji Aoki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 1047 days.

(21) Appl. No.: 11/776,928

(22) Filed: Jul. 12, 2007

(65) Prior Publication Data

US 2008/0013831 A1 Jan. 17, 2008

(51) Int. Cl.
*G06K 9/34* (2006.01)

(52) U.S. Cl. ........ 382/176; 358/1.9; 358/3.24; 358/538; 358/540; 382/190; 382/192

(58) Field of Classification Search .................... 358/1.2, 358/1.9, 1.15, 534, 536, 538, 540, 3.24; 382/173, 382/174, 176, 190, 192, 203, 301, 175
See application file for complete search history.

(56) References Cited

U.S. PATENT DOCUMENTS

| | | | |
|---|---|---|---|
| 5,416,603 A * | 5/1995 | Suzuki et al. ............ | 358/426.02 |
| 6,151,464 A * | 11/2000 | Nakamura et al. ............ | 399/79 |
| 6,266,156 B1 * | 7/2001 | Tanimura et al. ............ | 358/1.9 |
| 6,333,788 B1 * | 12/2001 | Yamada et al. ............ | 358/1.15 |
| 6,587,115 B2 * | 7/2003 | Gong et al. .................... | 345/596 |
| 6,661,921 B2 * | 12/2003 | Tanioka ........................ | 382/190 |
| 7,085,005 B2 * | 8/2006 | Kurose ............................ | 358/1.9 |
| 2004/0061883 A1 * | 4/2004 | Kanatsu ........................ | 358/1.9 |
| 2004/0136586 A1 * | 7/2004 | Okamura ..................... | 382/137 |
| 2005/0200903 A1 * | 9/2005 | Okubo ........................ | 358/3.24 |
| 2005/0271275 A1 * | 12/2005 | Chang .......................... | 382/176 |
| 2006/0078200 A1 * | 4/2006 | Koyama et al. .............. | 382/181 |
| 2007/0236707 A1 * | 10/2007 | Shoda ............................ | 358/1.2 |
| 2008/0013831 A1 * | 1/2008 | Aoki ............................. | 382/176 |

FOREIGN PATENT DOCUMENTS

| | | |
|---|---|---|
| JP | 2000-324338 | 11/2000 |
| JP | 2001-052186 | 2/2001 |
| JP | 2006-005680 | 1/2006 |

* cited by examiner

*Primary Examiner* — Gregory M Desire
(74) *Attorney, Agent, or Firm* — Harness, Dickey & Pierce, P.L.C.

(57) ABSTRACT

An image processing apparatus includes a binarizing unit, a determining unit, a counting unit, and a correcting unit. The binarizing unit binarizes image data based on density of the image data. The determining unit determines a pixel with high density as a character pixel and a pixel with low density as a non-character pixel in the binarized image data. The counting unit counts the number of a sequence of character pixels in a scanning direction. The correcting unit corrects, when the number of the sequence of the character pixels exceeds a threshold value, the character pixels to non-character pixels.

14 Claims, 19 Drawing Sheets

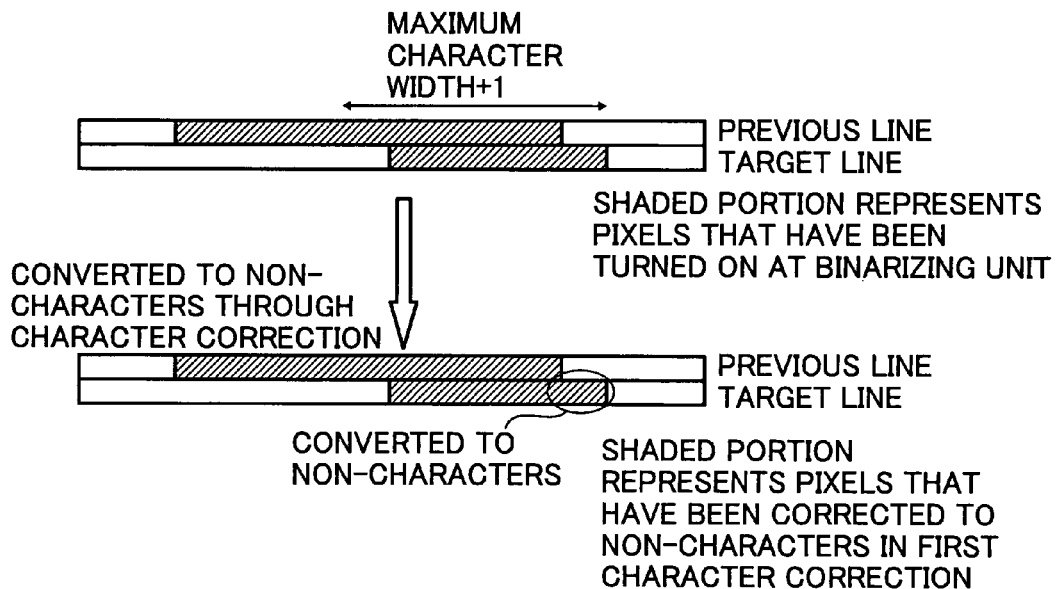
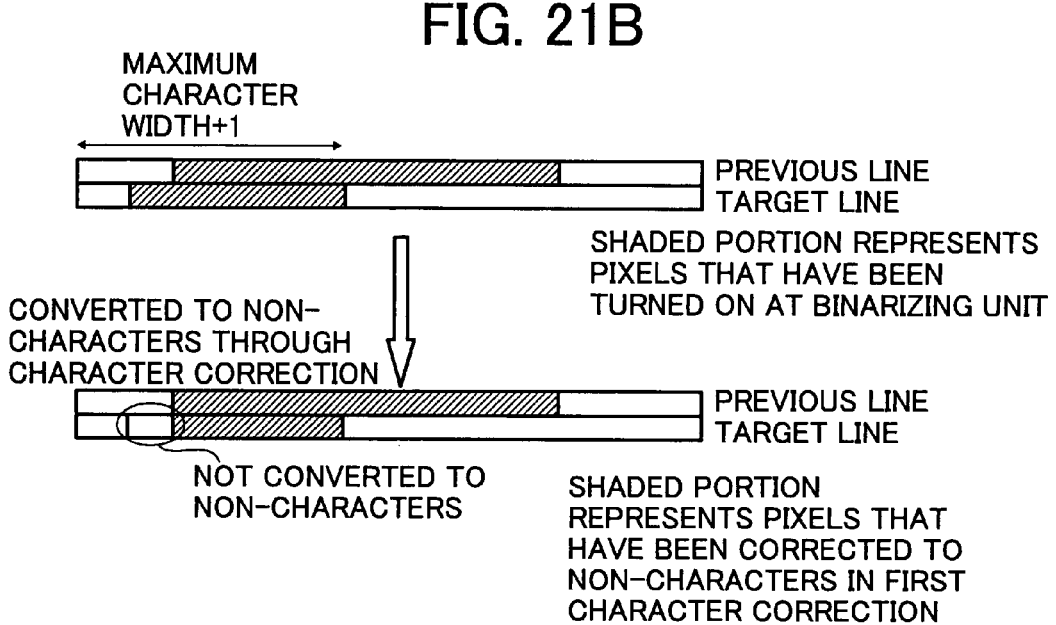

IMAGE PROCESSING APPARATUS, IMAGE FORMING APPARATUS, IMAGE DISTRIBUTING APPARATUS, IMAGE PROCESSING METHOD, COMPUTER PROGRAM PRODUCT, AND RECORDING MEDIUM

CROSS-REFERENCE TO RELATED APPLICATIONS

The present application claims priority to and incorporates by reference the entire contents of Japanese priority document, 2006-192211 filed in Japan on Jul. 12, 2006.

BACKGROUND OF THE INVENTION

1. Field of the Invention

The present invention relates to a technology for detecting a character area in an image.

2. Description of the Related Art

In digital image processing apparatuses, such as scanners and copiers, various areas of an input image, including character areas and picture areas, are distinguished for performing image processing suitable for each area and performing compression in a manner suitable for each area. Thus, image quality and compression efficiency are improved.

As a known technology of distinguishing a character area in a digital image, edges are extracted from digital image data by using the fact that characters often have high density and a large amount of edge, and a dense area between edges is taken as a character area.

With reference to FIG. 26, a conventional technology disclosed in Japanese Patent Application Laid-Open No. 2001-52186 is briefly explained. In this conventional technology, an edge in an image is extracted, and an edge group formed of a start point and an end point is generated. The start point represents a pixel determined as a switching point from a non-character area to a character area when the image is sequentially scanned by one line. The end point represents a pixel determined as a switching point from a character area to a non-character area. That is, the number of a sequence of pixels or the total number of pixels with a predetermined density or more is calculated among the generated edge groups and, based on the calculation result, it is determined whether a pixel among the edge group is in a character area. Thus, a character area can be extracted with high accuracy.

In another conventional technology disclosed in Japanese Patent Application Laid-Open No. 2006-5680, character areas are classified into an edge of a character and a character inner space (the inside of a character). After the edge of the character is extracted, the character inner space is determined.

However, in the former conventional technology, in line scanning, it is implicitly assumed that a left end of a character area (on a start point side) and a right end thereof (on an end point side) match edge conditions of the start point and the end point. In an actual image, however, pixels to be the start point and the end point do not always satisfy the respective edge conditions. Thus, character area extraction cannot be accurately performed.

For example, as shown in FIG. 27, when a changing point from a non-character area to a character area has a large amount of edge and a changing point from a character area to a non-character area has a small amount of edge, the start point is detected, but the end point is not detected. In this case, before the end point corresponding to the start point is found, the start point of the next character might be found. In such a case, an area supposed to be extracted as a character area will not be extracted as a character area.

A portion where no edge is extracted is a portion where a background and a character are gradually switched. That is, a stable character output cannot be achieved in the case of an image with gradation.

In this conventional technology, to obtain a character area, initial selection is performed to select character area candidates based on the concept that a character area in an image is always interposed between edges, and then secondary selection is performed by using density information of image data. An area even with one side not satisfying an edge condition is not determined as a character area.

Although edges provide useful information for determining a character area, there are unexpectedly many areas in which a boundary between a character and a non-character is not extracted as an edge. With secondary selection, character areas and non-character areas may be mixed to some extent. However, if many non-character areas are present among edges, it is difficult to identify a character area.

Therefore, there is a need for avoiding the case as shown in FIG. 27 and appropriately detecting a character area based on density information without depending on the edge group as shown in FIG. 28.

In the latter conventional technology, unlike the former one, an edge group does not have to be found. However, as in the former conventional technology, the character determination result depends on edges. Thus, a character area cannot be accurately extracted.

Moreover, particularly in general embedded devices, there are restrictions on memory, processing time, and others and, currently, memory-saving processing has always been desired. However, the former technology has a problem in which information about an edge group on a target line and information about an edge group on the previous line have to be retained in memory.

SUMMARY OF THE INVENTION

It is an object of the present invention to at least partially solve the problems in the conventional technology.

According to an aspect of the present invention, an image processing apparatus includes a binarizing unit that binarizes image data based on density of the image data to obtain binarized image data, a determining unit that determines a pixel with high density as a character pixel and a pixel with low density as a non-character pixel in the binarized image data, a first counting unit that counts number of a sequence of character pixels in a scanning direction, and a first correcting unit that corrects, when the number of the sequence of the character pixels exceeds a first threshold value, the character pixels to non-character pixels.

According to another aspect of the present invention, an image processing method includes binarizing image data based on density of the image data to obtain binarized image data, determining a pixel with high density as a character pixel and a pixel with low density as a non-character pixel in the binarized image data, first counting number of a sequence of character pixels in a scanning direction, and first correcting, when the number of the sequence of the character pixels exceeds a first threshold value, the character pixels to non-character pixels.

According to still another aspect of the present invention, a computer program product includes a computer program that implements the above methods on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21A is a schematic diagram for explaining the first character-correction process according to the first embodiment;

FIG. 21B is a schematic diagram for explaining problems in the first character-correction process according to the first embodiment;

DETAILED DESCRIPTION OF THE PREFERRED EMBODIMENTS

Exemplary embodiments of the present invention are explained in detail below with reference to the accompanying schematic diagrams. In the following explanation, RGB stands for "Red, Green, and Blue", and CMYK stands for "Cyan, Magenta, Yellow, and Black".

Figure 1:
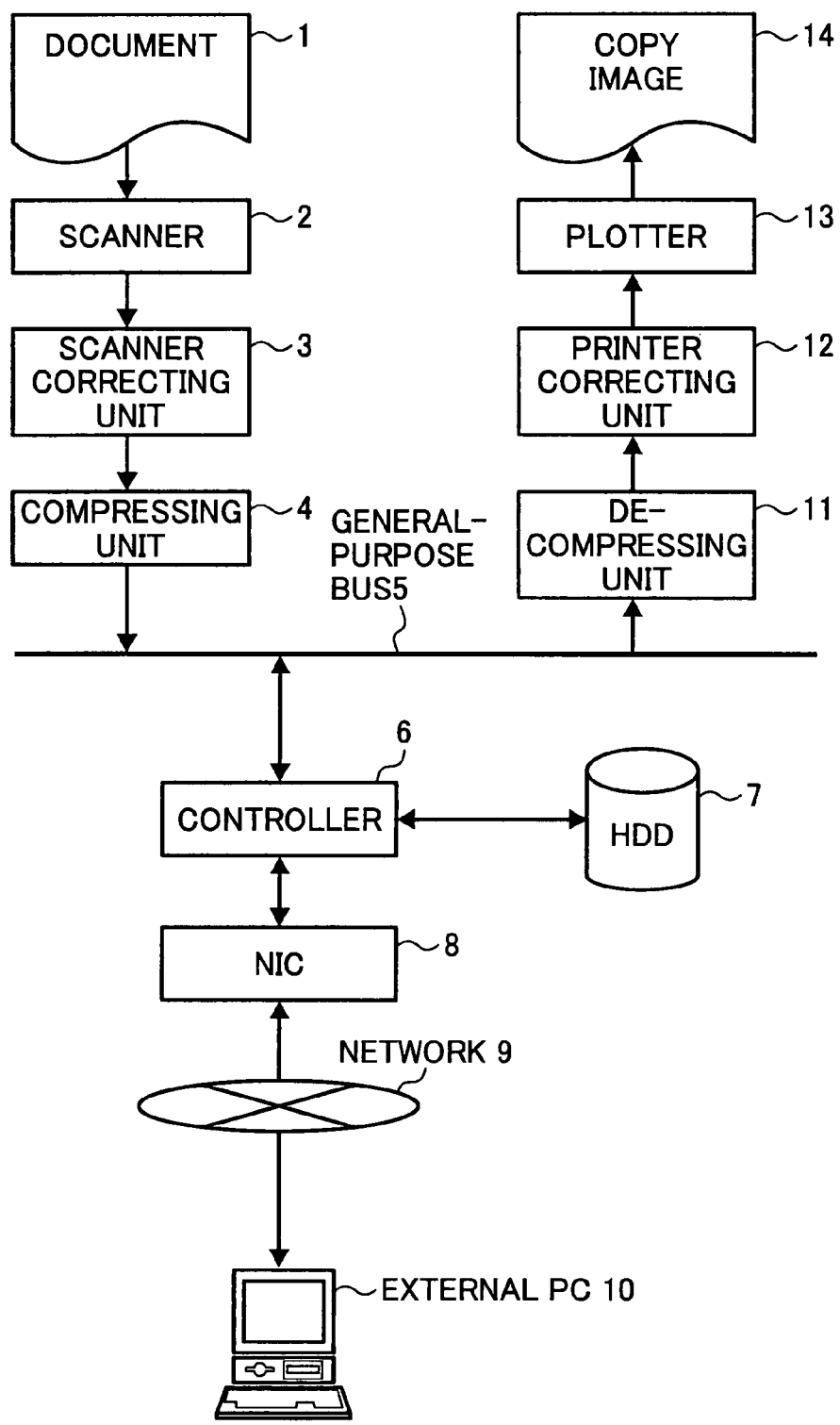
FIG. 1 is a block diagram of a digital color image processing apparatus according to a first embodiment of the present invention.

FIG. 1 is a block diagram of a digital color image processing apparatus according to a first embodiment of the present invention. The image processing apparatus has the entire or part of functions of copiers, scanner distributing devices, printers, and the like. The configuration of the image processing apparatus is explained with respect to each function.

When the image processing apparatus operates as a copier or an image forming apparatus, a scanner 2 reads image data from a document 1, and then converts image data (analog signal) to RGB data, which is digital data, for output. As explained further below, a scanner correcting unit 3 classifies image areas of the image data (RGB data) read by the scanner 2 into characters, line art, and photographs, for example, and then performs image processing (scanner correction), such as filtering. A compressing unit 4 performs a compression process on RGB image data each with 8 bits after scanner correction, an edge character area signal (1 bit), and a color area signal (1 bit), and then sends the results to a general-purpose bus 5. The compressed image data is then sent through the general-purpose bus 5 to a controller 6. The controller 6 has a hard disk drive (HDD) 7, which is a large-capacity storage device, in which the sent data is stored. The stored data has recorded thereon an image size and also the type of the read document as bibliographic information.

Although the image data is explained above as being compressed, if the band of the general-purpose bus 5 is sufficiently wide and the capacity of the HDD 7 for storage is large, data can be handled in a non-compressed state.

The controller 6 sends the image data in the HDD 7 to a decompressing unit 11 through the general-purpose bus 5. The decompressing unit 11 decompresses the compressed image data to the original RGB image data each with 8 bits, edge character area signal (1 bit), and color area signal (1 bit), and then sends the results to a printer correcting unit 12. In the printer correcting unit 12, a color correcting unit converts the RGB image data to CMYK data, and replaces a portion of the edge character area signal but not the color area signal by single-color K (black) data as a black character. Furthermore, a γ correction process, a halftone process, and other processes are performed. Then, a plotter 13 performs a process of correcting light and dark characteristics and a process of converting the number of gray-scale levels. In the process of converting the number of gray-scale levels, image data conversion from 8 bits to 2 bits for each color is performed by using error diffusion or dithering. In the plotter 13, a latent image is rendered on a photosensitive member by a transfer-sheet printing unit using a laser-beam writing process based on the image data of 2 bits. After image formation with toner and a transfer process, a copy image 14 is formed on a transfer sheet.

Thus, the plotter 13 functions as an image output unit that generates an image based on the image data subjected to image processing, forms the generated image on a sheet, and then outputs the image.

The case is explained in which the image processing apparatus operates as a distribution scanner (scanner distributing apparatus) that distributes image data to an external personal computer (PC) 10 via a network 9. The image data on the document 1 is sent through the general-purpose bus 5 to the controller 6 with the same process as explained above. In the controller 6, a color conversion process, a formatting process, and other processes are performed. In a gray-scale process, a gray-scale conversion process according to the mode at the time of operation of the distribution scanner is performed. In a formatting process, general-purpose format conversion to Joint Photographic Experts Group (JPEG) format, Tagged Image File Format (TIFF) and other processes are performed. The image data is then distributed to the external PC 10 via a network interface controller (NIC) 8.

Thus, the scanner 2 functions as a reading unit that reads a document image with color separation, generates image data, and then inputs the image data in the image processing apparatus. Also, the NIC 8 functions as a communicating unit that distributes the image data processed by the image processing apparatus over the network 9.

In the first embodiment, a device that functions as a communicating unit is implemented by the NIC 8. Alternatively, such a device can be implemented by a facsimile modem or a modem capable of full-duplex communication (not shown). In this case, the image data is distributed via the network 9, a telephone line, to a facsimile device (not shown).

When the image processing apparatus operates as a printer that prints out data from the external PC 10 via the network 9, for the data sent from the NIC 8, the controller 6 analyzes the image and a command for print instruction for bitmap development so as to allow the data to be printed as image data, and then compresses the developed data for storage in the HDD 7. The stored data has recorded thereon an image size and also the type of the read document as bibliographic information.

The controller 6 sends the image data in the HDD 7 to the decompressing unit 11 through the general-purpose bus 5. The decompressing unit 11 decompresses the compressed image data to the original 8-bit data, and then sends the results to the printer correcting unit 12. In the printer correcting unit 12, in the case of RGB inputs, the color correcting unit converts the RGB inputs to CMYK data. Furthermore, a γ correction process, a halftone process, and other processes are performed on CMYK independently. Then, the plotter 13 performs a process of correcting light and dark characteristics and a process of converting the number of gray-scale levels. In the process of converting the number of gray-scale levels, image data conversion from 8 bits to 2 bits for each color is performed by using error diffusion or dithering. In the plotter 13, a latent image is rendered on a photosensitive member by the transfer-sheet printing unit using a laser-beam writing process based on the image data of 2 bits. After image formation with toner and a transfer process, the copy image 14 is formed on a transfer sheet.

Figure 2:
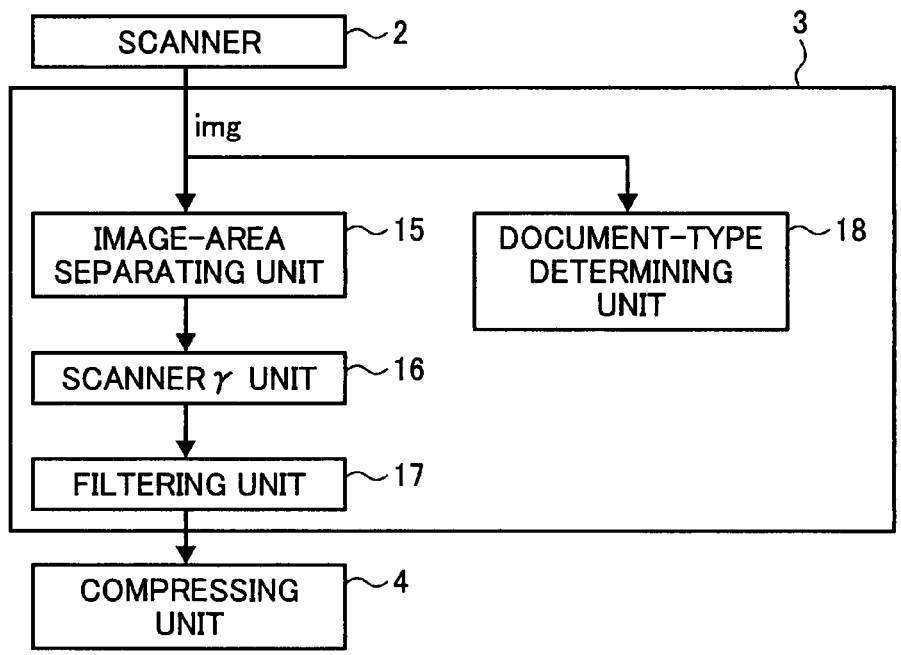
FIG. 2 is a block diagram of a scanner correcting unit shown in FIG. 1.

FIG. 2 is a block diagram of the scanner correcting unit 3. The scanner correcting unit 3 includes an image-area separating unit 15, a scanner γ unit 16, a filtering unit 17, and a document-type determining unit 18.

In general, in the digital image processing apparatus, a document is read by a scanner, image data is converted to digital data, and image areas of the document are also classified into areas with different features (image area separation). Then, it is determined which area a target pixel belongs to. According to the determination result, various image processes are performed on the image data. With these image processes, image quality of the output image can be significantly increased.

The image-area separating unit 15 separates image areas based on image data "img" (linear reflectivity) input from the scanner. In the first embodiment, the technology disclosed in Japanese Patent Application Laid-Open No. 2003-259115 regarding image area separation is used for separation into three areas, that is, a black edge character area, a color edge character area, and others (photographic area).

The image area separation results are provided to the image data for each image pixel. From an image-area separation signal, the areas are classified into a black edge character area (an edge character area, but not a color area), a color edge character area (an edge character area and also a color area), and a photographic area (others).

The scanner γ unit 16 converts the image data from data with linear reflectivity to data with linear density.

The filtering unit 17 switches a filter process with the image-area separation signal. In the edge character area (black edge characters and color edge character), a sharpening process is performed with emphasis on readability. In the photographic area, a change in density in the image data is taken as the amount of edge, and a smoothing process or sharpening process is performed according to the amount of edge. A steep edge is sharpened so that a character in a picture can be easily read.

The document-type determining unit 18 uses a document determination block (document-type recognizing device) disclosed in Japanese Patent Application Laid-Open No. 2000-324338 to classify documents into four types, that is, document with characters, color document, photograph on photographic paper, and printed photograph.

Specifically, determination as to document with characters is described in paragraphs [0023] to [0025]. Determination as to color document is described in paragraphs [0026] and [0027]. Determination as to photograph on photographic paper is described in paragraph [0028]. Determination as to printed photograph is described in paragraphs [0029] to [0031].

Using the determination results under the four determination conditions, it is determined whether the document is a document only with characters or a color document.

Also, the determination result is recorded on the HDD 7 as bibliographic information when the image data is stored.

The document is determined as a document only with characters under the condition of a document with character (Yes), a photographic document on photographic paper (No), and a printed photographic document (No).

The document is determined as a color document under the condition of a color document (Yes) from among the conditions mentioned above.

The document only with characters is a document that contains characters only.

Pictures on a copy document or an inkjet document are subjected to a gray-scale process, and such a document is classified as a photograph on photographic paper or a printed photographic document.

Figure 3:
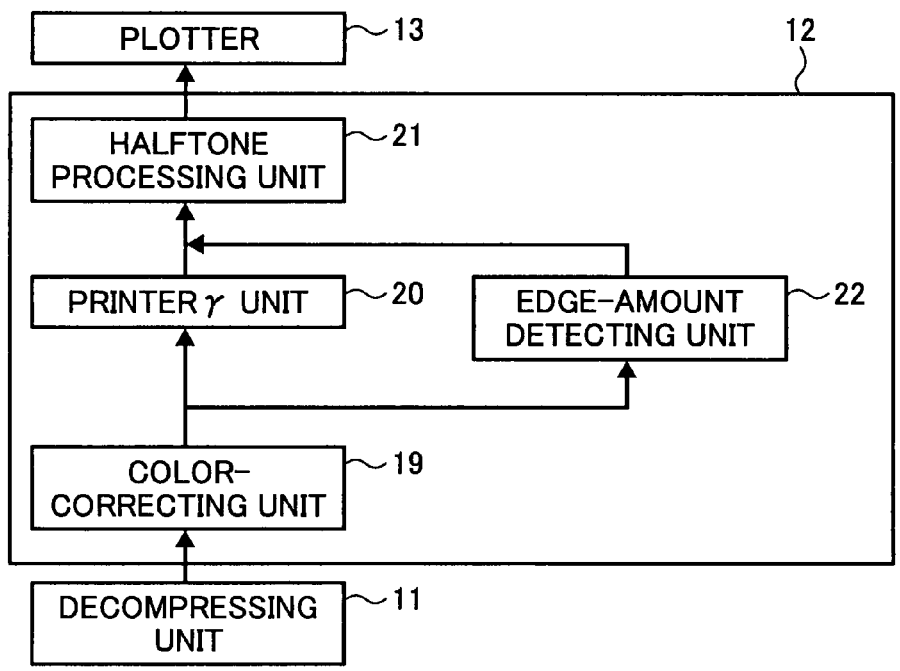
FIG. 3 is a block diagram of a printer correcting unit shown in FIG. 1.

FIG. 3 is a block diagram of the printer correcting unit 12. The printer correcting unit 12 includes a color correcting unit 19, a printer γ unit 20, a halftone processing unit 21, and an edge-amount detecting unit 22.

The printer γ unit 20 performs γ correction on the image data processed by the compressing unit 4 and the decompressing unit 11 according to γ frequency characteristics of the plotter 13.

The halftone processing unit 21 performs quantization, such as dithering or error diffusion, according to halftone characteristics of the plotter 13 and the amount of edge for halftone correction. At the time of quantization, a black character signal (black character extraction explained below) can be produced to emphasize contrast of a black character. This improves character readability.

The edge-amount detecting unit 22 detects a change in density in the image data as an amount of edge.

The color correcting unit 19 converts RGB data in the areas of the image data other than the black edge character area to CMY data through initial density masking. To improve color reproducibility of the image data, a common portion in CMY data is subjected to under color removal (UCR) to generate K data, thereby outputting CMYK data.

If a black character in the document 1 is colored due to a shift in RGB reading position of the scanner 2 or if there is a shift in superposing position when the plotter 13 prints the CMYK data, readability is poor. To get around this problem, the color correcting unit 19 outputs only the black edge character area as single-color K data (data without outputting CMY) with a signal corresponding to brightness.

Figure 4:
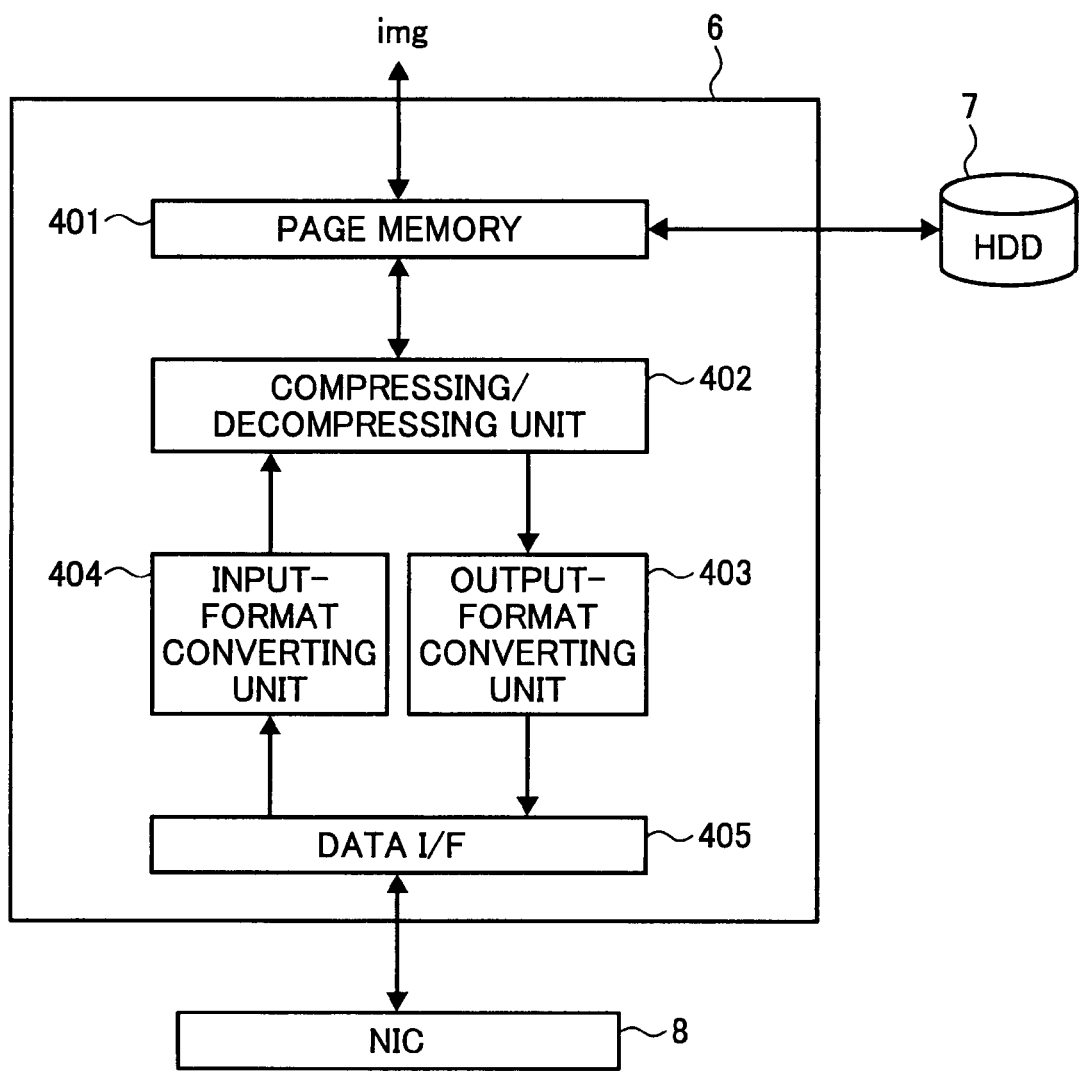
FIG. 4 is a block diagram of a controller shown in FIG. 1.

FIG. 4 is a block diagram of the controller 6. The controller 6 includes a page memory 401, a compressing/decompressing unit 402, an output-format converting unit 403, an input-format converting unit 404, and a data interface (I/F) 405.

A flow of data when the image data is output to an external device is explained.

When image data is passed from the general-purpose bus 5 or the HDD 7 to the controller 6, the image data is first placed on the page memory 401.

The image data on the page memory 401 is processed by the compressing/decompressing unit 402. A decompressing processing unit (not shown) decompresses the compressed image data to the original data of 8 bits for each color for output to the output-format converting unit 403. The output-format converting unit 403 performs color conversion on RGB data to standard RGB (sRGB) data in standard color space and, at the same time, performs general-purpose image format conversion to JPEG, TIFF, or Portable Document Format (PDF), for example. The data I/F 405 outputs the data of the output-format converting unit 403 to the NIC 8.

Next, a flow of data when the image data from an external device, such as the external PC 10, is output via the controller 6 to the plotter 13 is explained.

A command for instruction from outside is analyzed by a central processing unit (CPU) (not shown), and is written in the page memory 401. The image data from the data I/F 405 is developed by the input-format converting unit 404 to bitmap data, is compressed by the compressing/decompressing unit 402, and is then written in the page memory 401.

In the input format data, an image to be developed is a natural image, such as the one in JPEG or TIFF.

Figure 5:
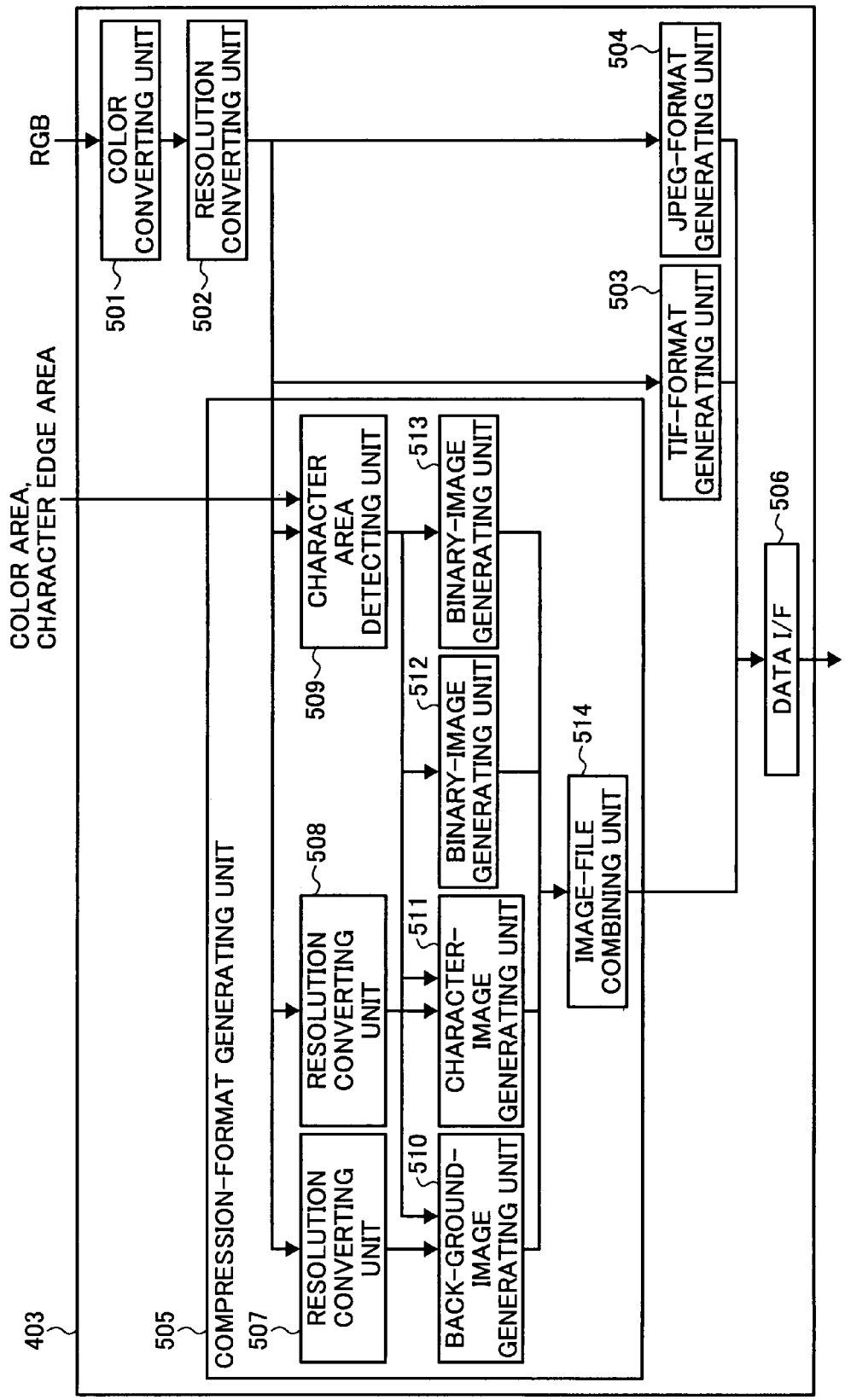
FIG. 5 is a block diagram of an output-format converting unit shown in FIG. 4.

FIG. 5 is a block diagram of the output-format converting unit 403. The output-format converting unit 403 includes a color converting unit 501, a resolution converting unit 502, a TIF format generating unit 503, a JPEG-format generating unit 504, a compression-format generating unit 505, and a data I/F 506.

The color converting unit 501 converts input RGB data to sRGB data.

The resolution converting unit 502 converts the sRGB-converted data to data with a pixel density of 200 dots per inch or 300 dots per inch, for example. In the first embodiment, a case is exemplarily explained in which the data is converted to data with a pixel density of 300 dots per inch.

The format of the resolution-converted image data is converted by a relevant one of the format generating units (the TIF format generating unit 503, the JPEG-format generating unit 504, and the compression-format generating unit 505) to a relevant format. The data I/F 506 outputs data in a format to be output to the NIC 8.

The compression-format generating unit 505 includes a resolution converting unit 507, a resolution converting unit 508, a character-area detecting unit 509, a background-image generating unit 510, a character-image generating unit 511, a black-image generating unit 512, a binary-image generating unit 513, and an image-file combining unit 514.

The character-area detecting unit 509 outputs binary data representing a character area and a non-character area based on light and dark density of the image data through character determination. Then, black character data is output through inner-character-space determination.

The resolution converting units 507 and 508 each convert the resolution of the image data downward to 150 dots per inch. Because a character image does not require a resolution as much as a background image does, the resolution after conversion by the resolution converting unit 508 sending data to the character-image generating unit 511 can be on the order of 75 dots per inch.

The binary-image generating unit 513 performs Modified Modified Read (MMR) compression, which is reversible conversion, on binary data.

The black-image generating unit 512 performs MMR compression, which is reversible conversion, on black character data.

The background-image generating unit 510 rewrites the image data in the area which has become a character area through character determination explained further below with image data in which pixels corresponding to white have a predetermined value for JPEG compression, which is irreversible compression.

The character-image generating unit 511 performs JPEG compression, which is irreversible compression, on image data in the background area. For the background image, the data in the character area is converted to have a predetermined value because such conversion is to have a predetermined value increases compressibility. Also for the character image, the data in the background area is converted to have a predetermined value because such conversion increases compressibility.

When the bibliographic information of the image data stored in the HDD 7 indicates "a document only with characters", a JPEG file with a resolution of 75 dots per inch is created for each of the background image and the character image. The resolution of the characters is decreased because the character resolution is ensured with the MMR resolution and therefore a decrease in JPEG resolution does not pose a problem although gray-scale is degraded. By decreasing the resolution, the file size can be reduced.

In the first embodiment, the file size of the image data is compressed by decreasing the resolution. Alternatively, the file size can be compressed by decreasing another element representing image quality, such as the number of gray-scale levels.

The data stored in the HDD 7 has written therein whether the bibliographic information indicates "a document only with characters". Therefore, for the image data after being stored in the HDD 7, the compressibility of the "document only with characters" can be increased.

The image-file combining unit 514 combines four images, that is, an output from the binary-image generating unit 513 (MMR), an output from the black-image generating unit 512 (MMR), an output from the background-image generating unit 510 (JPEG), and an output from the character-image generating unit 511 (JPEG), into one file. As a file format at this time, a general-purpose format (for example, PDF file format) can be used.

The character-area detecting unit 509 extracts a plurality of amounts of characteristics, thereby outputting binary data representing a character and a black character.

The following processing is sequential processing in which, after one process is over, a process is performed on the adjacent pixel and, after one line has been processed, processing is performed from the top of the next line, thereby continuing the processing to the end of the image. It is assumed herein that RGB image data becomes blacker with a larger numerical value, while it becomes whiter with a smaller numerical value.

Figure 6:
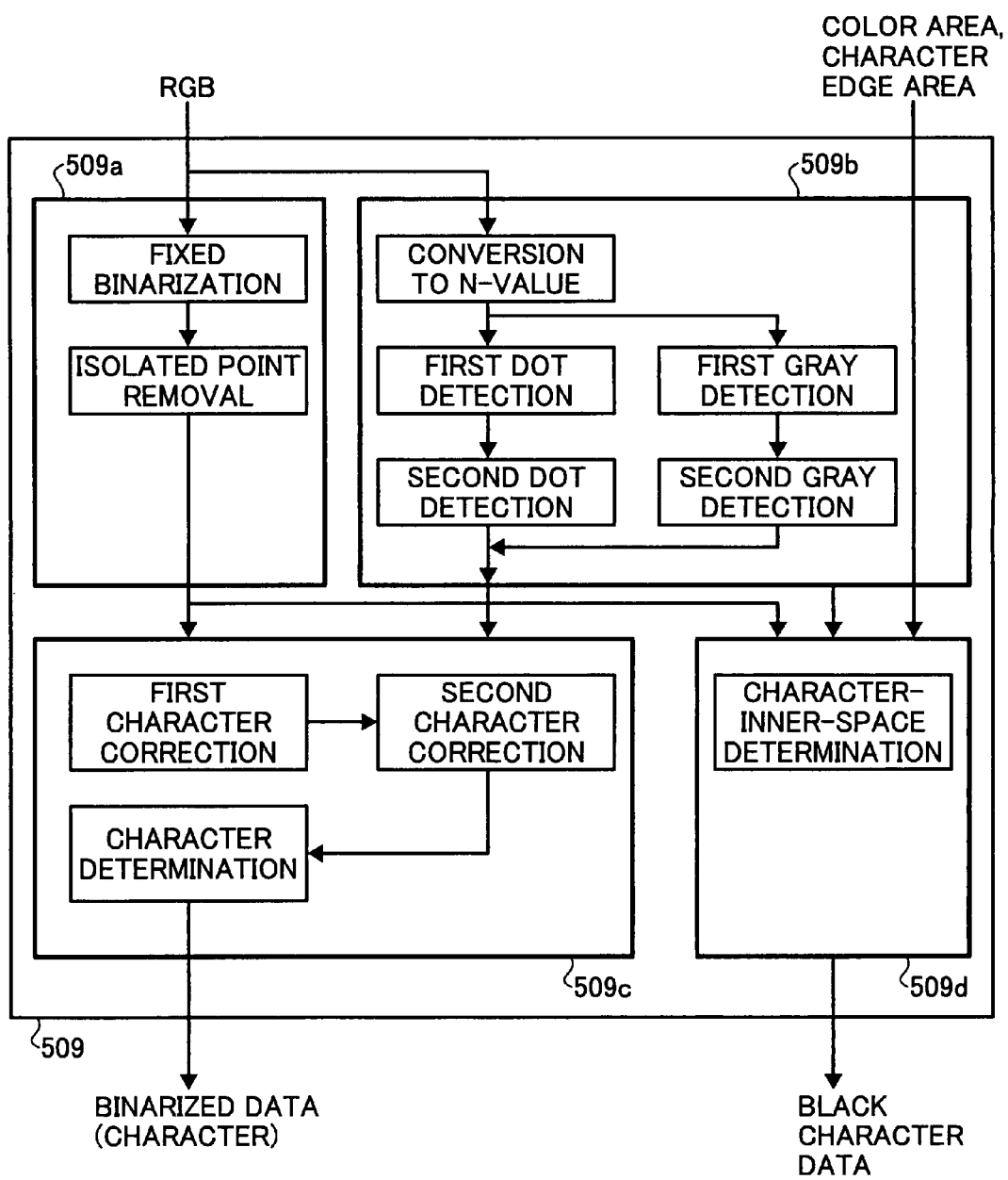
FIG. 6 is a block diagram of a character-area detecting unit shown in FIG. 5.

The character-area detecting unit 509, which is a main unit of the first embodiment, is further explained by using FIG. 6.

The character-area detecting unit 509 includes a binarizing unit 509a, a mask unit 509b, a character determining unit 509c, and a character-inner-space determining unit 509d. Processes performed by the four units are explained below in detail.

The binarizing unit 509a performs binarization based on dark and light in density. The binarizing unit 509a performs fixed binarization and isolated point removal. Although any binarizing method can be taken, binarization is performed based on a fixed threshold in the first embodiment.

In the fixed binarization, for predetermined RGB thresholds, if all RGB values of input RGB image data do not exceed the threshold values, a determination "black" (on) is output. Otherwise, a determination "white" (off) is output.

Figure 15:
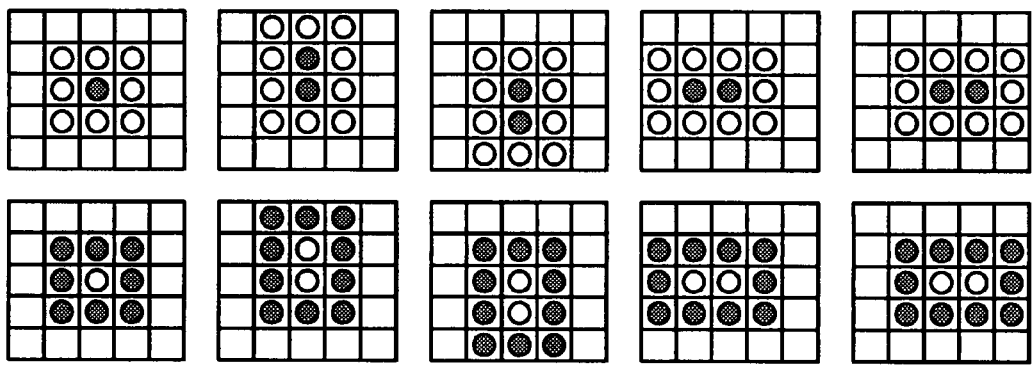
FIG. 15 is examples of isolated-point patterns according to the first embodiment.

The isolated point removal is performed because the fixed binarization results generally include many isolated points. If a target pixel matches any one of ten patterns shown in FIG. 15, the target pixel is reversed to remove an isolated point. In FIG. 15, squares in a lattice shape each represent one pixel (the same goes for FIGS. 16, 17, and 18), where a black circle represents a black pixel as a result of binarization, while a white circle represents a non-black pixel as a result of binarization.

The mask unit 509b generates image data for masking the binarizing unit 509a. Conversion to N-value is performed on the image data and, by using the conversion result, two types of processes, that is, dot detection and gray detection, are performed. In the conversion to N-value, features of dot detection and gray detection explained further below are converted to an N-value. In the dot detection and the gray detection, data commonly converted to an N-value is used.

When data with a small difference in RGB (considered as black or monochrome) has a value larger than "thabk", the data is taken as representing a black character. For data with a not small difference in RGB, the color is classified into six colors, that is, YMCBGR. Binarization is performed based on thresholds ("thay", "tham", "thac", "thab", "thag", and "thar") for the respective color phases, and a pixel densely colored is taken an active pixel.

The color phases can be classified simply based on the magnitude of RGB or based on a color ratio of RGB. This is determined by the input image characteristics.

The output result is retained by color phase, and defined as follows:
Dtah=0 (000): not applicable
Dtah=1 (001): yellow
Dtah=2 (010): magenta
Dtah=3 (011): cyan
Dtah=4 (100): blue
Dtah=5 (101): green
Dtah=6 (110): red
Dtah=7 (111): black
where the number in parentheses represents an example of bit display.

Similarly, binarization is performed for white level. When data with a small difference in RGB (considered as black or monochrome) has a value smaller than "thbbk", the pixel is taken as a white pixel. For data with a not small difference in RGB, the color is classified into six colors, that is, YMCBGR. Binarization is performed based on thresholds ("thby", "thbm", "thbc", "thbb", "thbg", and "thbr") for the respective color phases, and a pixel lightly colored is taken an active pixel (white pixel).

In first and second dot detections, for the purpose of detecting a coarse dot, dot pattern matching is performed.

It is assumed that a pixel with Dtah≠0 is taken as a black pixel, while a pixel converted to a white pixel as a result of conversion to N-value is taken as a white pixel.

Figure 7:
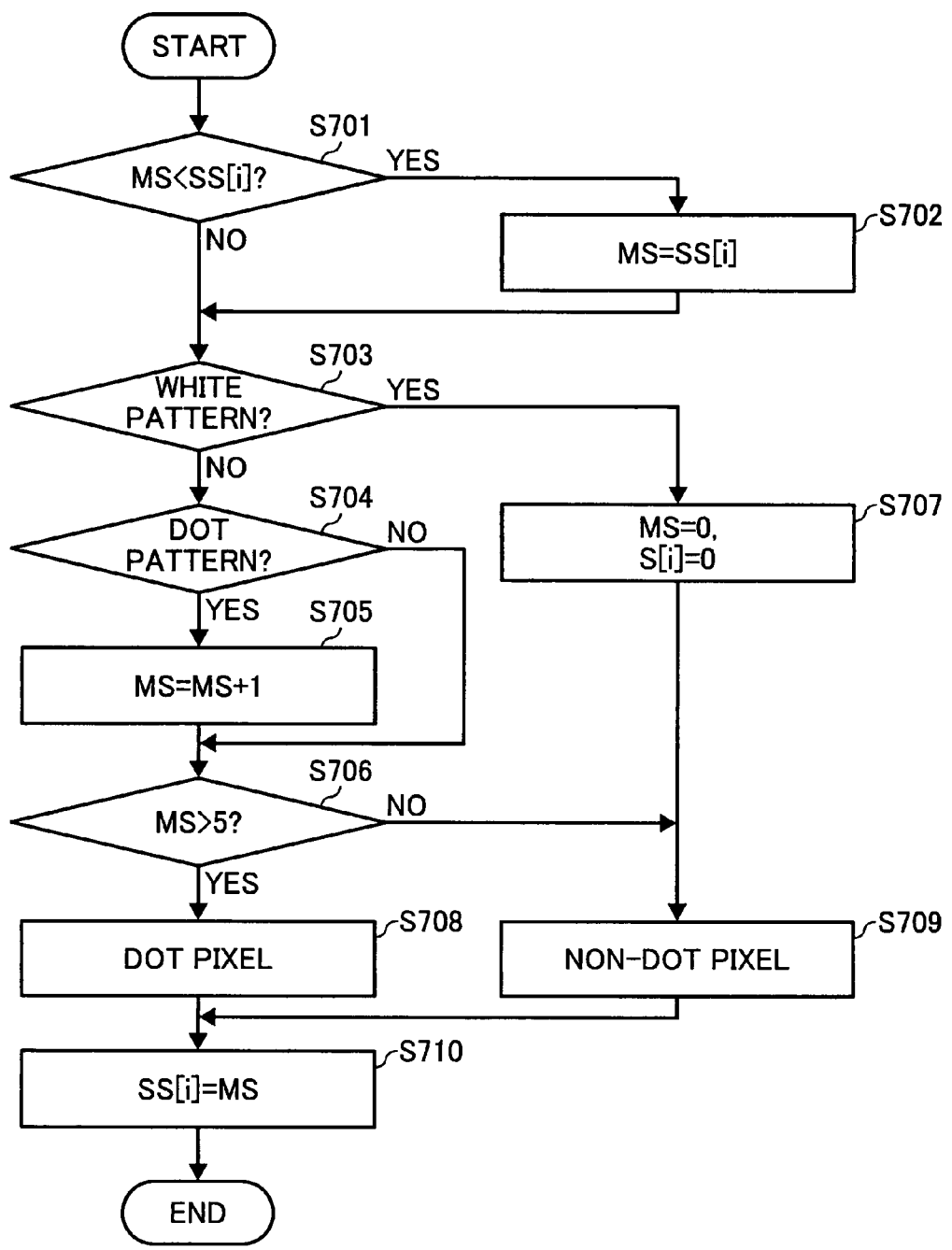
FIG. 7 is a flowchart of a dot detection process according to the first embodiment.

FIG. 7 is a flowchart of the dot detecting process. MS represents the process result for the previous pixel, while SS[i] represents the process result for the previous line. MS and SS[i] is compared (step S701), and a larger one of the result for the previous line and the result for the previous pixel is taken (step S702). MS is a dot count value, which is explained further below.

Figure 16:
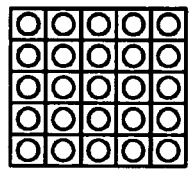
FIG. 16 is examples of a white pattern according to the first embodiment.

FIG. 16 is examples of a white pattern. If pixels matches the white pattern (Yes at step S703), MS=0 and S[i]=0 (step S707), and they are used in a line next to S[i] (step S710). The pixels are taken as non-dot pixels (step S709). If pixels do not match the white pattern (No at step S703), the process control goes to step S704.

Figure 17:
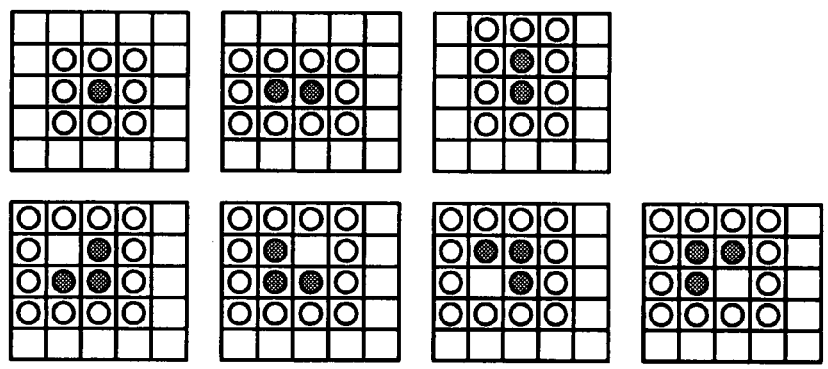
FIG. 17 is examples of dot patterns according to the first embodiment.

FIG. 17 is examples of dot patterns, in which a black circle represents a black pixel, while a white circle represents a non-black pixel. If pixels match a dot pattern (Yes at step S704), MS is incremented by 1 (step S705). To increase accuracy in dot detection, a condition that a non-black pixel includes several white pixels can be added.

If MS>5 (Yes at step S706), the pixels are taken as dot pixels (step S708). If MS>5 does not stand (No at step S706), the pixels are taken as non-dot pixels (step S709). With S[i]=MS, S[i] is used on the next line (step S710). Dot pixel determination is performed as explained above.

In contrast to the first dot detection where the image data is processed in a forward direction, a second dot detection is performed in a backward direction. A portion with its tip is not taken as a dot in the first dot detection is read in reverse, so that that portion is taken as a dot.

In first and second gray detection, by using the fact that the character area is dark and an area surrounding the characters is light, gray determination is made in which a portion with its density lighter than the density of the character area and darker than the density of the character surrounding area is taken as an area with intermediate density. A white pixel obtained as a result of conversion to N-value is used in the gray determination.

Figure 8:
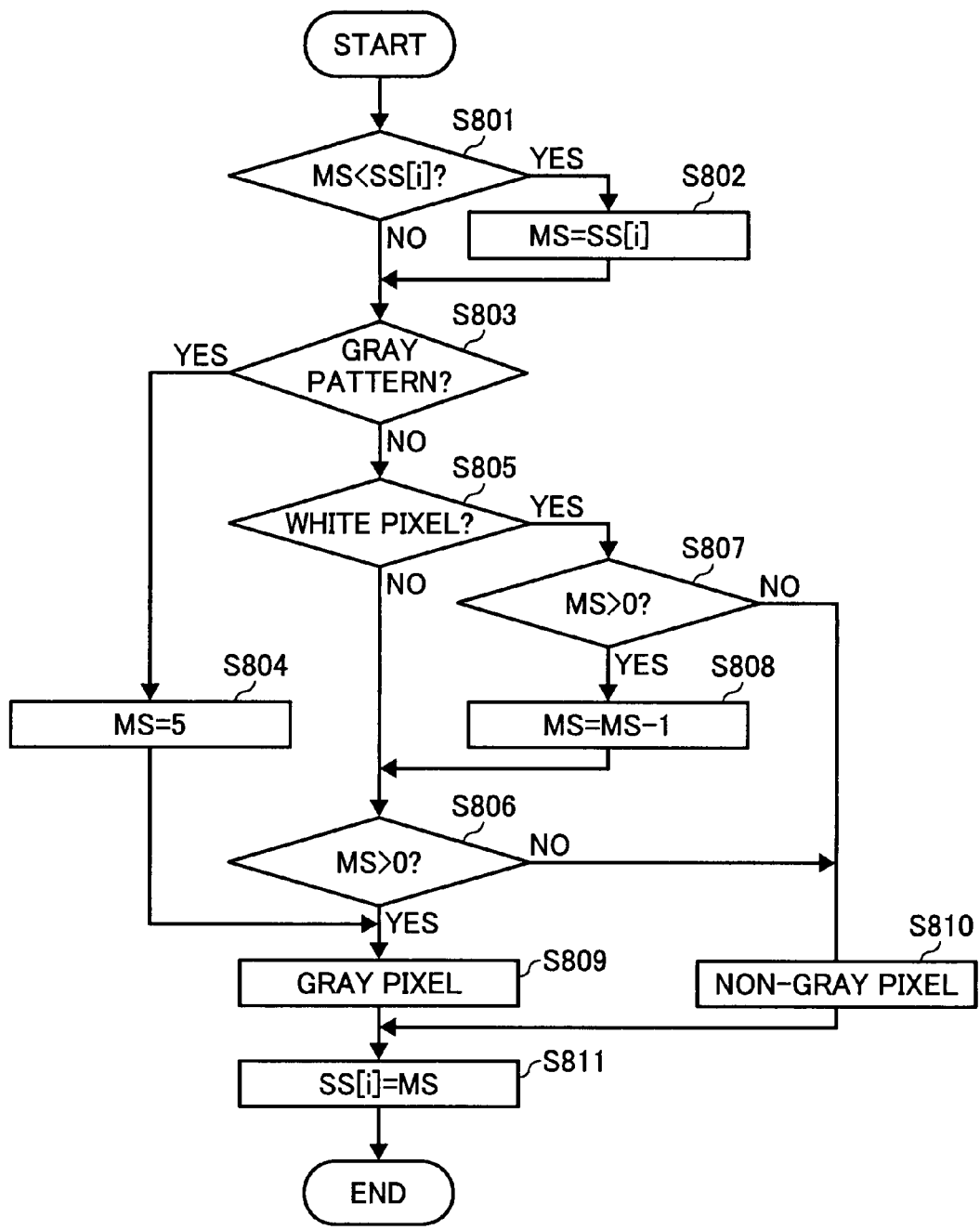
FIG. 8 is a flowchart of a gray detection process according to the first embodiment.

FIG. 8 is a flowchart of a gray detection process. MS represents the process result for the previous pixel, while SS[i] represents the process result for the previous line. MS and SS[i] is compared (step S801), and a larger one of the result for the previous line and the result for the previous pixel is taken (step S802). MS represents the number of white pixels after gray detection, which is explained further below.

Figure 18:
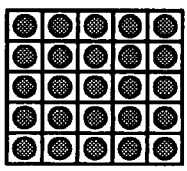
FIG. 18 is an example of a gray pattern according to the first embodiment.

FIG. 18 is an example of a gray pattern. If pixels match the gray pattern (Yes at step S803), the area is taken as a gray area. That is, if the pixels with intermediate density matches the gray pattern, the process control goes to step S804, where MS=5 and S[i], and the pixels are taken as gray pixels (step S809).

A pixel with intermediate density is a non-white pixel in conversion to N-value with Dtah=0. If the pixels do not match the gray pattern, the process control goes to step S805.

A white pixel indicates a white pixel obtained through conversion to N-value. If a white pixel is present (Yes at step S805), the process control goes to step S807. If a white pixel is not present (No at step S805), the process control goes to step S806.

If MS>0, the pixels are taken as gray pixels (Yes at step S806). If MS>0 does not stand, the pixels are taken as non-gray pixels (No at step S806).

If MS>0 (Yes at step S807), MS is decremented by 1 (step S808), and the process control goes to step S806. If MS>0 does not stand (No at step S807), the pixels are taken as non-gray pixels (step S810). Then, with s[i]=MS, s[i] is used for the next line (step S811).

In contrast to the first gray detection where the process is performed in a forward direction, a second gray detection is performed in a backward direction. With such a process in a backward direction, a portion with a tip of the gray area is not taken as a gray can be taken as gray.

The character determining unit 509c determines a character area in the image from the output result obtained by the binarizing unit 509a and the mask unit 509b. The character determining unit 509c is a main unit of the first embodiment. Among the areas determined as characters by the binarizing unit 509a, an area with a large main-scanning-line width is converted to a non-character area. Here, the black pixel (on) as a result of binarization is regarded as a character pixel, while the white pixel (off) is regarded as a non-character pixel. In the binarizing unit 509a, binarization is performed only with light and dark, and therefore a large dark area tends to be determined as a character. If the character pixels are continued over a predetermined character width, it is highly possible that that portion does not represent a character. Therefore, the process of the character determining unit 509c is reasonable. The number of pixels forming a character width is variable depending on the resolution of the image data, and can be defined according to corresponding maximum character width specifications.

The character determining unit 509c is achieved with a first character correction, a second character correction, and a character determination process. The first character correction is a process in a forward direction, while the second character correction is a process in a backward direction. In the first and second character corrections, to identify a large dark area, the number of pixels in a main scanning direction is used, but the number of pixels in a sub-scanning direction is not used due to memory saving. If memory for use is not strictly restricted, lines in the sub-scanning direction may be stored in memory to perform a similar process also in the sub-scanning direction.

The first and second character corrections are explained in detail.

Figure 9:
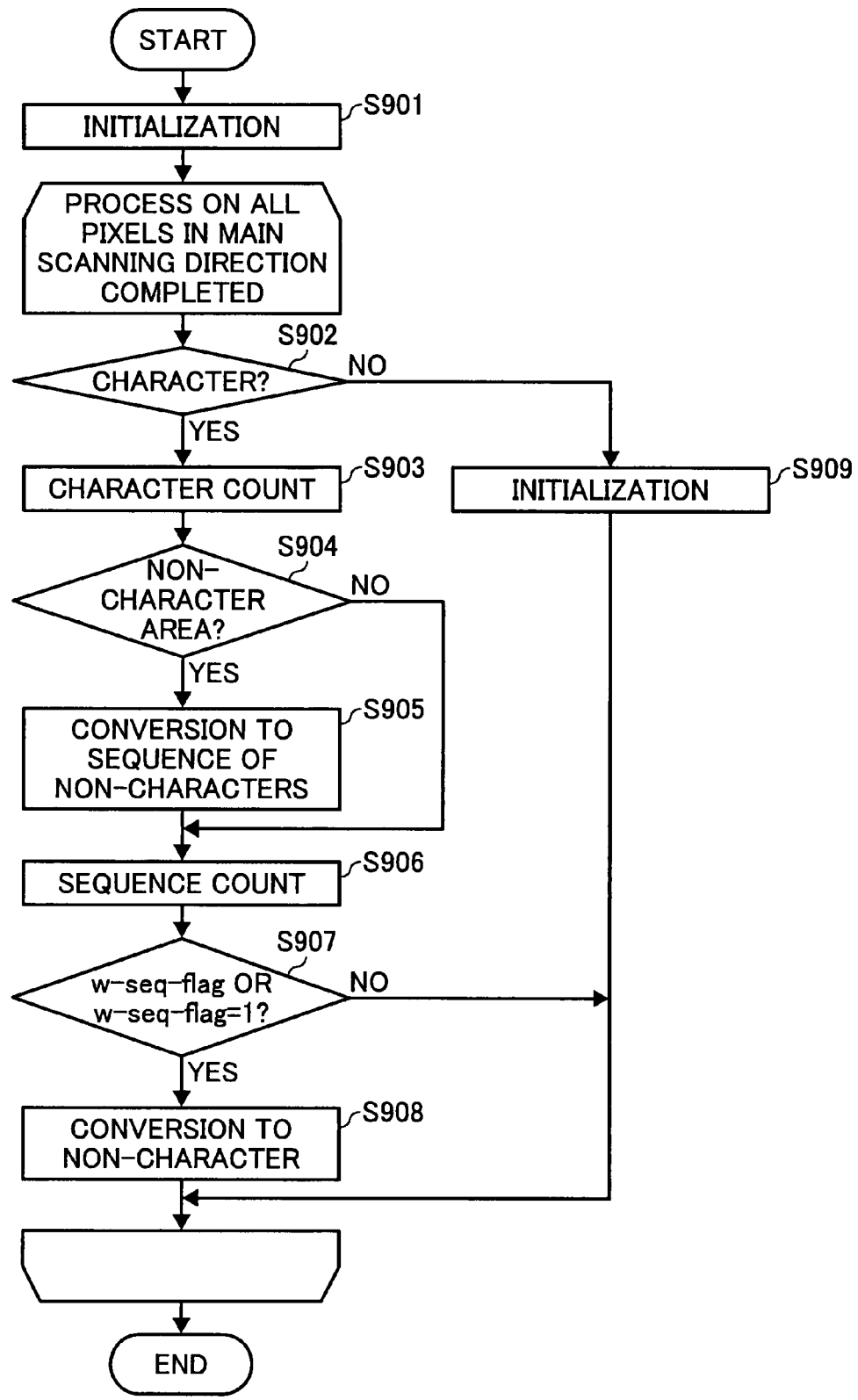
FIG. 9 is a flowchart of a first character-correction process according to the first embodiment.

FIG. 9 is a flowchart of the first character-correction process. Here, a non-character pixel as a result obtained by the binarizing unit 509a is explicitly referred to as "a non-character as a result of binarization", and simply a non-character refers to a pixel determined as a non-character through this character-correction process.

Variables in the explanation represent as follows:
block_w_count: a counter of a character as a result of binarization in a main scanning direction
block_w_size: a predetermined maximum number of character pixels in the main scanning direction+1 (varied depending on image resolution)
SS[i]: a result of character correction on the previous line, where i represents a position of a pixel in the main scanning direction
h_seq_flag: sequence flag in the main scanning direction
w_seq_flag: sequence flag in a sub-scanning direction
himoji_flag: a variable for storing information about where there is an excess over the character width at the time of determining the target pixel The counter is initialized as follows (step S901):
block_w_size is substituted into block_w_count
h_seq_flag, w_seq_flag, himoji_flag, and SS[i] are cleared to 0 (converted to an undefined value)

The counter block_w_count is assumed herein to be of a decrement-type counter that sets the maximum number of character pixels.

If the target pixel has been determined as a character by the binarizing unit 509a (Yes at step S902), the process control goes to step S903. Otherwise, the process control goes to step S909.

If a character counter indicates a value greater than 0 (step S903), block_w_count is decremented. If block_w_count indicates 0, the area is regarded as a non-character area with the target pixel being taken as an end pixel (Yes at step S904), and the process control goes to step S905 for conversion to a sequence of non-characters. Otherwise, the process control goes to step S906.

If block_w_count indicates 0, set himoji_flag=1. Otherwise, set himoji_flag=0.

With the target pixel being taken as a right end, pixels as many as the number indicated by block_w_size in the main scanning direction are converted to non-characters (step S905).

Figure 19:
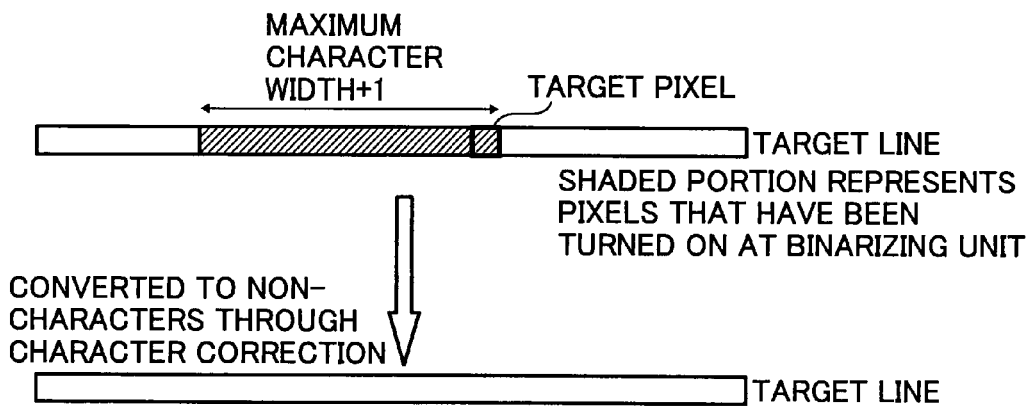
FIG. 19 is a schematic diagram for explaining a first conversion-to-non-character process of the first character-correction process according to the first embodiment.

This process is performed as shown in FIG. 19 when an area of a sequence of characters in the main scanning direction with the target pixel being taken as an end pixel has pixels exceeding the maximum number of character pixels. With this process, a character area having pixels exceeding the maximum number of character pixels in the main scanning direction can be eliminated.

If the previous-line pixel/the previous pixel is a non-character (step S906), w_seq_flag and h_seq_flag are set to "1". If w_seq_flag or h_seq_flag indicates 1 (step S907), the target pixel is converted to a non-character (step S908).

Figure 20:
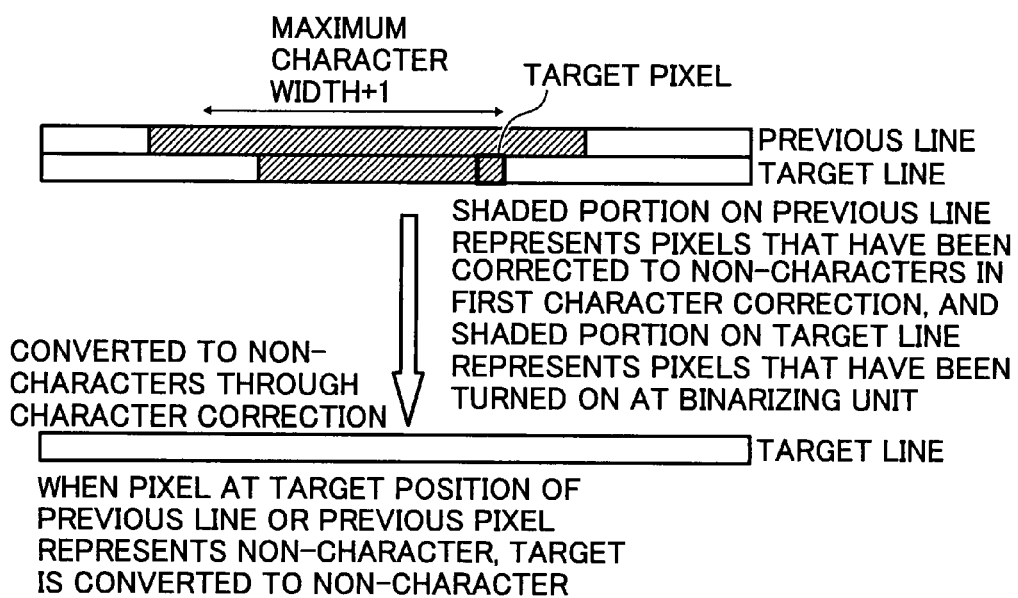
FIG. 20 is a schematic diagram for explaining a second conversion-to-non-character process of the first character-correction process according to the first embodiment.

This process is performed when the area does not exceed the maximum character width in the main scanning direction but, as shown in FIG. 20, the previous pixel or a pixel on the previous line at the same pixel position as that of the target pixel has been determined as a non-character. For referring to the previous line, SS[i] is referred to.

In the first embodiment, the process is performed when the previous pixel or a pixel on the previous line at the same pixel position as that of the target pixel has been determined as a non-character. Alternatively, the process may be performed when both of the pixels mentioned above have been determined as non-characters. Still alternatively, for example, a condition can be added that a pixel on the previous line at the same position as the previous pixel of the target pixel has been determined as a non-character. In this manner, the first character correction determination result of the determined pixel on the target line and the previous line can be used for determination.

With this process, locally-dependent character/non-character determination can be prevented, thereby improving reliability. Also, by referring to the previous line, the possibility of conversion to a non-character can be increased even on an area extending in the sub-scanning direction and determined as a character as a result of binarization even if the area is in fact a non-character area.

The counter is initialized as follows (step S909):

h_seq_flag, w_seq_flag, and himoji_flag are cleared to 0 the value of block_w_size is substituted into block_w_count

Also, the target pixel at the time of performing this process is taken as a character pixel as a result of the first character correction. This result is referred to for character determination in the subsequent stage.

In the first embodiment, as explained below, the condition for a character pixel is such that the output result obtained by the binarizing unit 509*a* is "character". Therefore, even if a correction is made at this step S909 as a "character" pixel as the first character correction result, the pixel is not determined as a character pixel eventually. However, this is not the case in an embodiment where the determination condition in character determination at the subsequent stage is varied.

In the first character correction, as shown in FIG. 21A, the conversion to a non-character is performed as long as the previous pixel is determined as a non-character even if the target pixel has been determined by the binarizing unit 509*a* as a character. However, when the target pixel is determined as a non-character, conversion to a non-character is not performed even if the previous pixel has been determined by the binarizing unit 509*a* as a character. This is not desirable in view of contrast. The second character correction is performed to convert a pixel that was not be able to be converted to a non-character in the first character correction, such as that shown in FIG. 21B, to a non-character.

Figure 10:
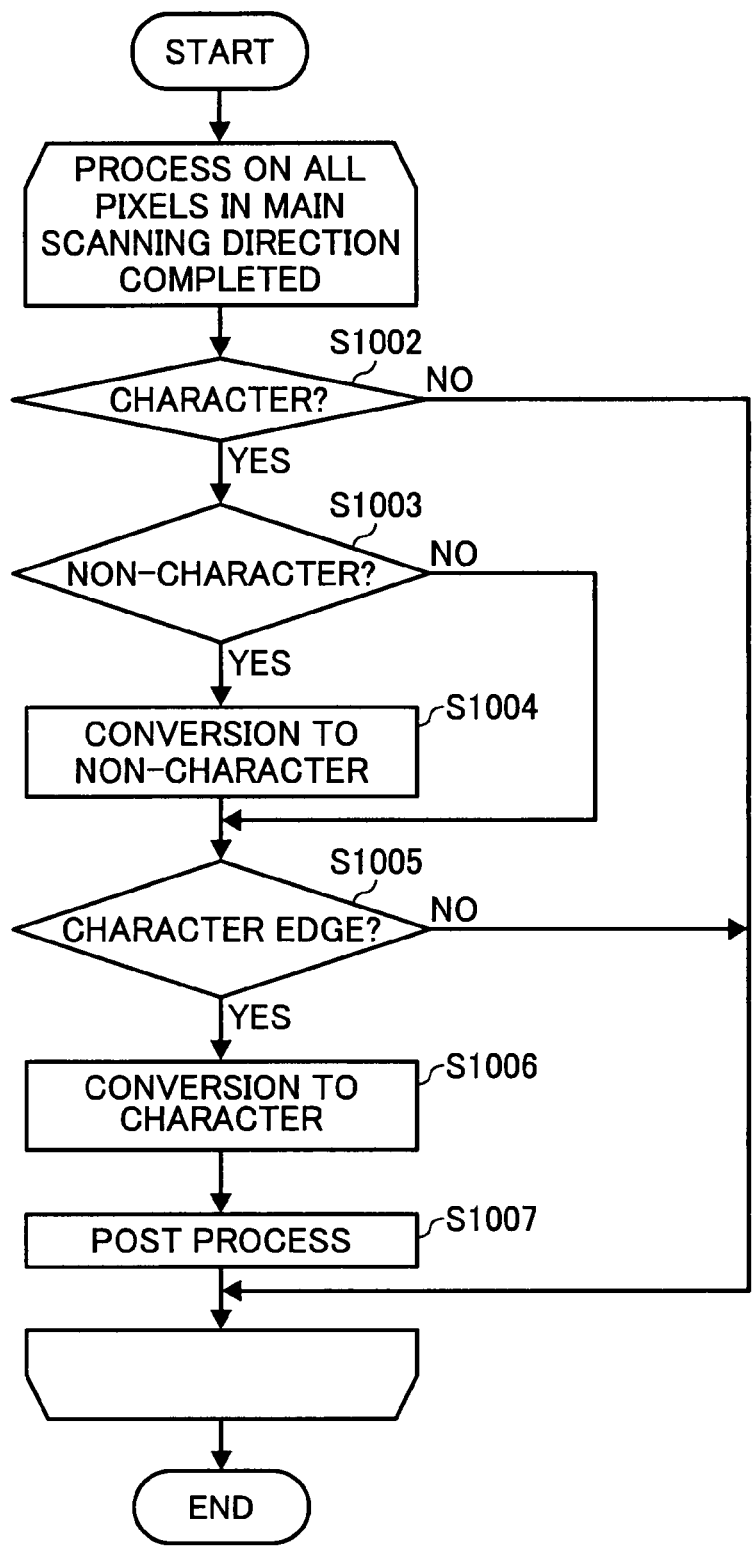
FIG. 10 is a flowchart of a second character-correction process according to the first embodiment.

FIG. 10 is a flowchart of the second character-correction process. Here, a non-character pixel as a result obtained by the binarizing unit 509*a* is explicitly referred to as "a non-character as a result of binarization", and simply a non-character refers to a pixel determined as a non-character through this character-correction process.

If the target pixel is determined by the binarizing unit 509*a* as a character (Yes at step S1002), the process control goes to step S1003.

If the previous pixel represents a non-character (Yes at step S1003), the target pixel is converted to a non-character (step S1004). With this process, the pixel as shown in FIG. 21B is converted to a non-character.

If a character edge signal indicates that there is an edge (Yes at step S1005), the process control goes to step S1006. Otherwise, the next pixel is processed. This process can be omitted, but can be used when a line that would not be output as a character without this process is desired to be converted to a character. The character edge signal indicates the character determination result, which is the output result of image separation at the previous stage.

The output result is converted to a character (step S1006). This process is to convert a line portion to a character. A line is not a character, but is often desired to be handled in a manner as that of a character after output of result. Even if a long line is "on", the line will be converted to a non-character in the character-correction process. Since a line is often extracted as an edge, if such an edge is present, the pixel converted to a non-character is returned to character, thereby converting the line portion to a character.

Here, "conversion to character" merely means that the result of the second character correction is represented by a "character". This result is referred to for character determination at the subsequent stage of the second character correction. Even if the pixel is determined as a "character" at this step S1006, if the pixel has been determined as a "dot" in the first dot detection, for example, the final output is a "non-character".

The result of the process-target line is copied to SS[i] as post process (step S1007).

The following is conditions to determine whether a pixel is a character pixel or a non-character pixel:

The output result obtained by the binarizing unit 509*a* indicates "character"

The result of the first or second dot detection does not indicate "dot"

The result of the first or second gray detection does not indicate "gray"

The result of the first or second character correction does not indicate "non-character"

If the conditions are satisfied, the pixel is determined as a character pixel. If the conditions are not satisfied, the pixel is determined as a non-character pixel.

Then, the determination result is reflected in the binarized data for output to the next stage.

This character determination output is one of the final outputs of the character-area detecting unit 509. Another output is from the character-inner-space determining unit 509*d*, which outputs a black character area (black character data).

Figure 11:
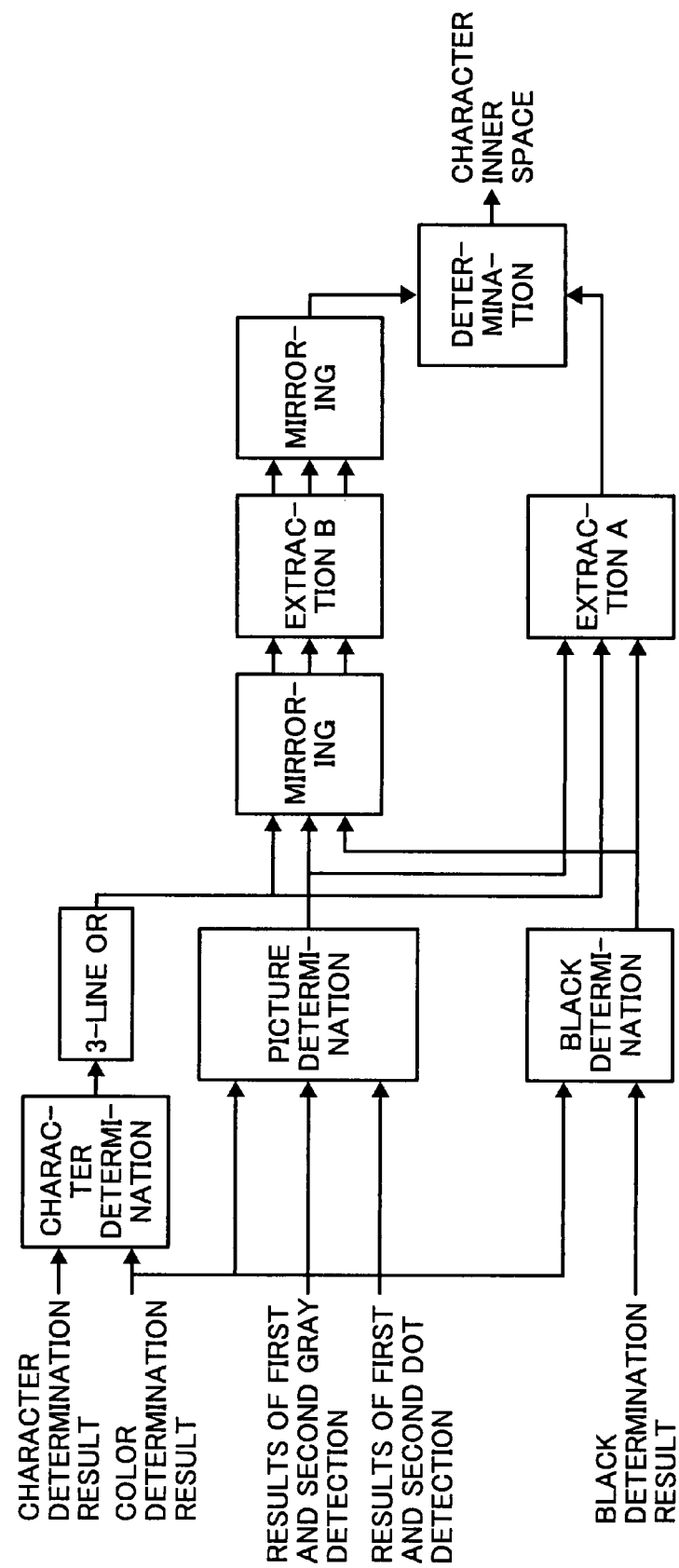
FIG. 11 is a schematic diagram for explaining a character-inner-space determination process according to the first embodiment.

FIG. 11 is a schematic diagram for explaining character-inner-space determination. The character-inner-space determination is a series of processes including character determination, 3-line OR, picture determination, black determination, extraction A, extraction B, and twice mirroring.

In the character determination, a logical operation is performed between the character determination result and the color determination result, which are the output results of image area separation at the previous stage. If the determination indicates "character" and "monochrome", "black character edge" is output.

In the 3-line OR, OR of 3 lines×1 pixel of the black character edge, which represents the character determination result, is taken. Normally, instead of this 3-line OR, 2-line delay has to be performed after the extraction A to match with the extraction B in line delay. However, if line delay is performed after the extraction A, the image data has to be delayed. For this reason, by performing a 3-line OR process here, line delay is absorbed.

In the picture determination, if any one of output results of image area separation at the previous stage indicates "on", a determination "picture" is made. The output results include results of the color determination, the first gray detection, the second gray detection, the first dot detection, and the second dot detection.

In the black determination, if the color determination result, which is the output result of the image area separation at the previous stage, indicates monochrome and the conversion to N-value results in black (K or dark black), a determination "black" is made.

The extraction A is a process of extracting a character inner space. While the extraction B is a process on image data of a reversed image, the extraction A is a process on image data of a normal image.

Figure 12:
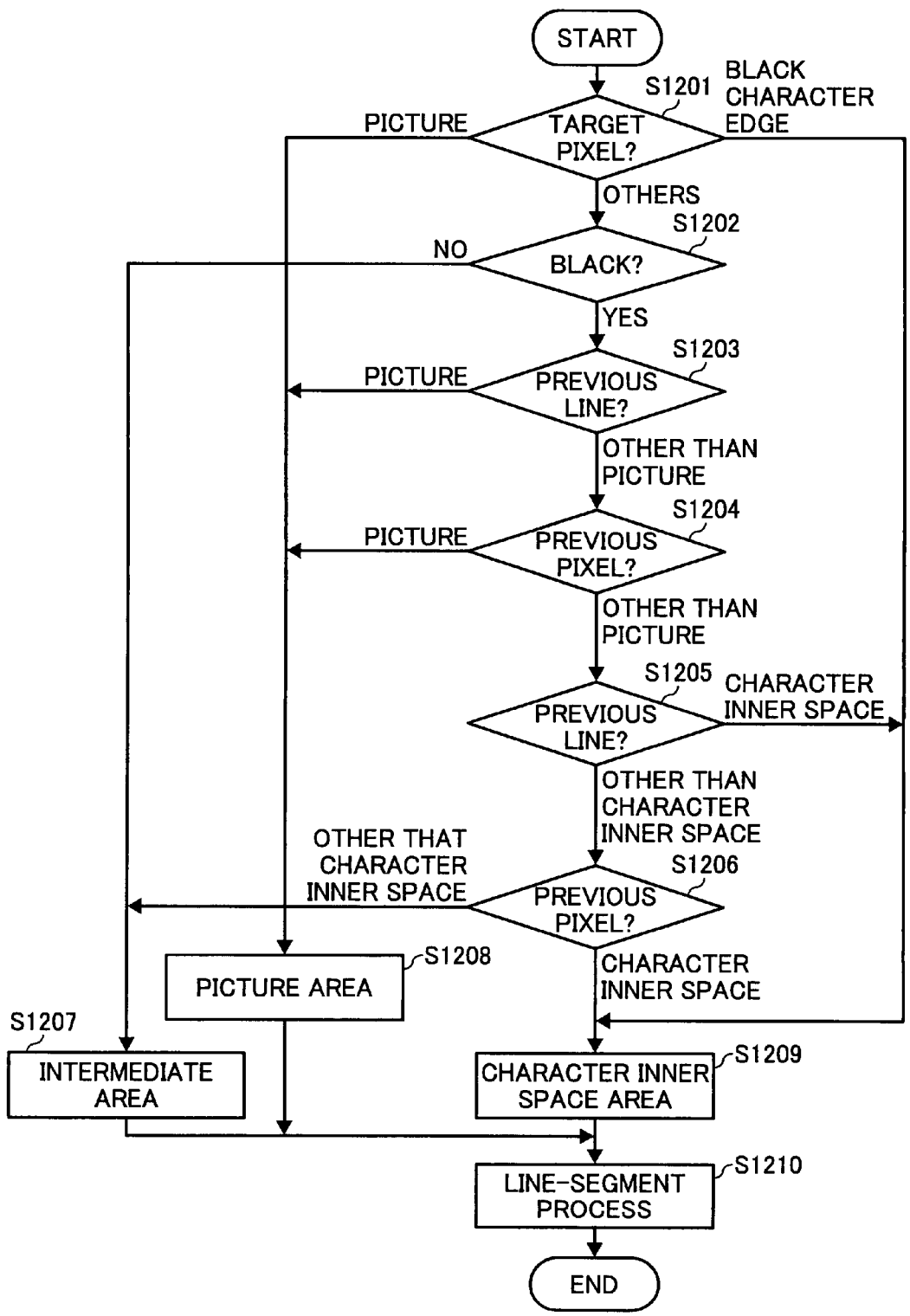
FIG. 12 is a flowchart of an extraction A process of the character-inner-space determination process.

FIG. 12 is a flowchart of the extraction A process. In FIG. 12 and the following explanation, the output of 3-line OR is referred to as "black character edge", the result of picture determination is referred to as "picture", and the result of black determination is referred to as "black" for simplicity.

Target pixel determination is performed (step S1201). Specifically, a black character edge indicates a character-inner-space area. Picture indicates a picture area.

Under the algorithm of image area separation, character and picture cannot be "on" at the same time.

Unless the result of black picture determination on the target line indicates black (No at step S1202), a determination "intermediate area" is made (step S1207).

It is determined whether the determination result on the previous line after line-segment process indicates "picture area" (step S1203). Then, it is determined whether the determination result on the previous pixel indicates "picture area" (step S1204).

It is determined whether the determination result on the previous line after linear-segment process indicates "character-inner-space area" (step S1205). Then, it is determined whether the determination result on the previous pixel indicates a character-inner-space area (step S1206).

If the determination result indicates neither picture area nor character inner space area, a determination "intermediate area" is made (step S1207).

If the determination result at steps S1201, S1203, and 1204 indicate "picture area", a determination "picture area" is made (step S1208).

If the determination result at steps S1201, S1205, and S1206 indicate "character-inner-space area", a determination "character-inner-space area" is made (step S1209).

After that, a line-segment process is performed (step S1210), which is a process of correcting the black determination result of the previous line.

According to the first embodiment, if the color determination result does not indicate "color" and 144 pixels or more with high density are continuously present, a correction is made with a determination "intermediate area" in this module (character inner space). Data to be output to the next stage is not corrected (the result before a line-segment process is output to a determining unit at the next stage).

In the extraction B, and mirroring, character-inner-space determination is made in a reversed (mirrored) image. To achieve such a process in a reversed image with a pipeline process, mirroring is performed before and after the extraction B. The extraction B is similar to the extraction A, and therefore, the same explanation is not repeated.

The character-inner-space determining unit 509d makes a determination "black character" if the output of the extraction A and the output of mirroring in the extraction B both indicate "character-inner-space area" and the output from the binarizing unit 509a indicates "black character". Data to be output is "black character area (black character data)".

If the result of the black-character extracting unit and the output of the binarizing unit 509a indicate "character", a determination "black character" is made.

A computer program can be executed on a computer to realize the same function as the image processing apparatus including the character-area detecting unit 509. For example, such a computer program is previously stored in a recording medium such as a read-only memory (ROM). The computer program is loaded from the ROM into a microprocessor or the like in the image processing apparatus, and executed.

The recording medium can be a semiconductor medium, an optical medium, and a magnetic disk. Examples of the semiconductor medium include ROM and non-volatile memory card). Examples of the optical medium include digital versatile disc (DVD), magneto-optical (MO) disk, minidisc (MD), and compact-disk recordable (CD-R). Examples of the magnetic disk include a magnetic tape and flexible disk.

An operating system or the like can perform all or part of the functions of the image processing apparatus according to the computer program.

The computer program can also be stored in a storage device of a server such as an HDD, and downloaded from the server to a computer of a user connected thereto via a network. In this manner, if the computer program is recorded on a recording medium for distribution, cost efficiency, portability, and versatility is improved.

Figure 27:
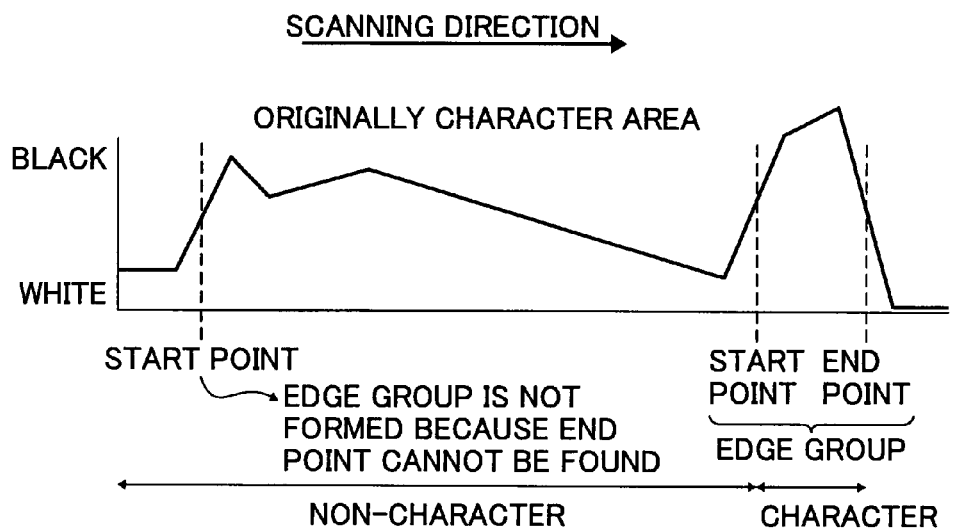
FIG. 27 is a schematic diagram for explaining problems in the conventional technology.
Figure 28:
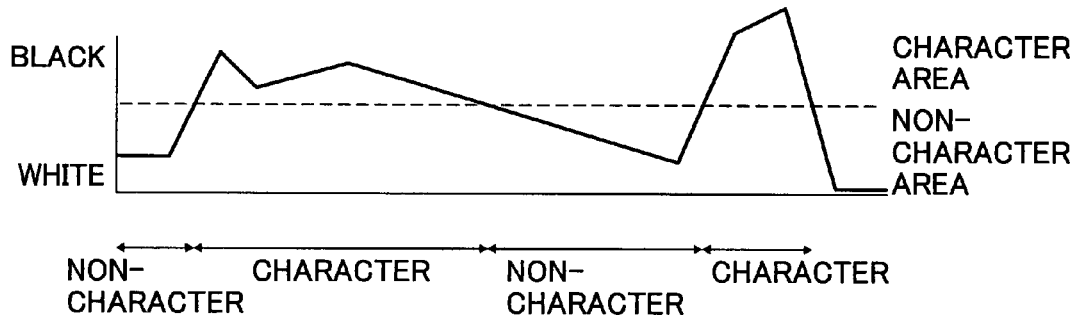
FIG. 28 is a schematic diagram for explaining that character area extraction is performed based on not only an edge group but also density information.

As described above, according to the first embodiment, to extract a character area without losing a character area to the extent possible, a determination is made based on density information instead of initial selection with edge information. As shown in FIG. 28, the case as shown in FIG. 27 that cannot be supported by the conventional technologies can be supported. Moreover, only the output result regarding the previous line is required to be retained differently from the conventional technology in which information about an edge group on a target line and information about an edge group on the previous line have to be retained in memory. This enables a memory-saving process.

A determination regarding conversion to non-character can be made as long as data regarding the target line is retained in the memory. Also, data that does not exceed the maximum number of pixels under character specifications is not taken as a character. Therefore, a memory-saving character area determination can be made without losing a character area to the extent possible.

The result of character area determination is propagated. Therefore, in addition to local information, a wide range of information is utilized, thereby increasing reliability and avoiding local dependency. Besides, the results of the character area determination regarding not only the target line but also the previous line are used, thereby detecting a non-character area elongated in a sub-scanning direction with a memory-saving configuration.

A dot area and an intermediate density area, which are not likely to be character areas, are converted to non-character areas. This further increases accuracy in detecting character areas.

An edge of image data is converted to a character area. Thus, a thin line segment, which could be determined as a non-character area, can be determined as a character area.

A second embodiment of the present invention is explained below. The second embodiment is different from the first embodiment only in the process of first character correction, and therefore, only the first character correction is explained.

Figure 22:
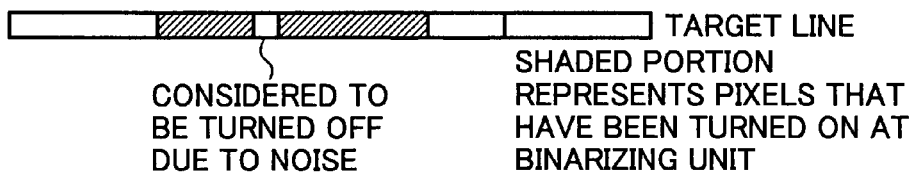
FIG. 22 is a schematic diagram for explaining binarization results with noise according to the second embodiment.

This process is one of the variations of character correction. There may be a case where, as a pattern shown in FIG. 22, even if areas that are turned "on" by the binarizing unit 509a due to darkness continue, these areas has white in the middle for several pixels due to noise in the image. To support such a case where several pixels are "off" (in character correction, "off" is regarded as non-character), a process is performed in which the "on" counting process by the binarizing unit 509a continues even with "off" for several pixels.

Figure 13:
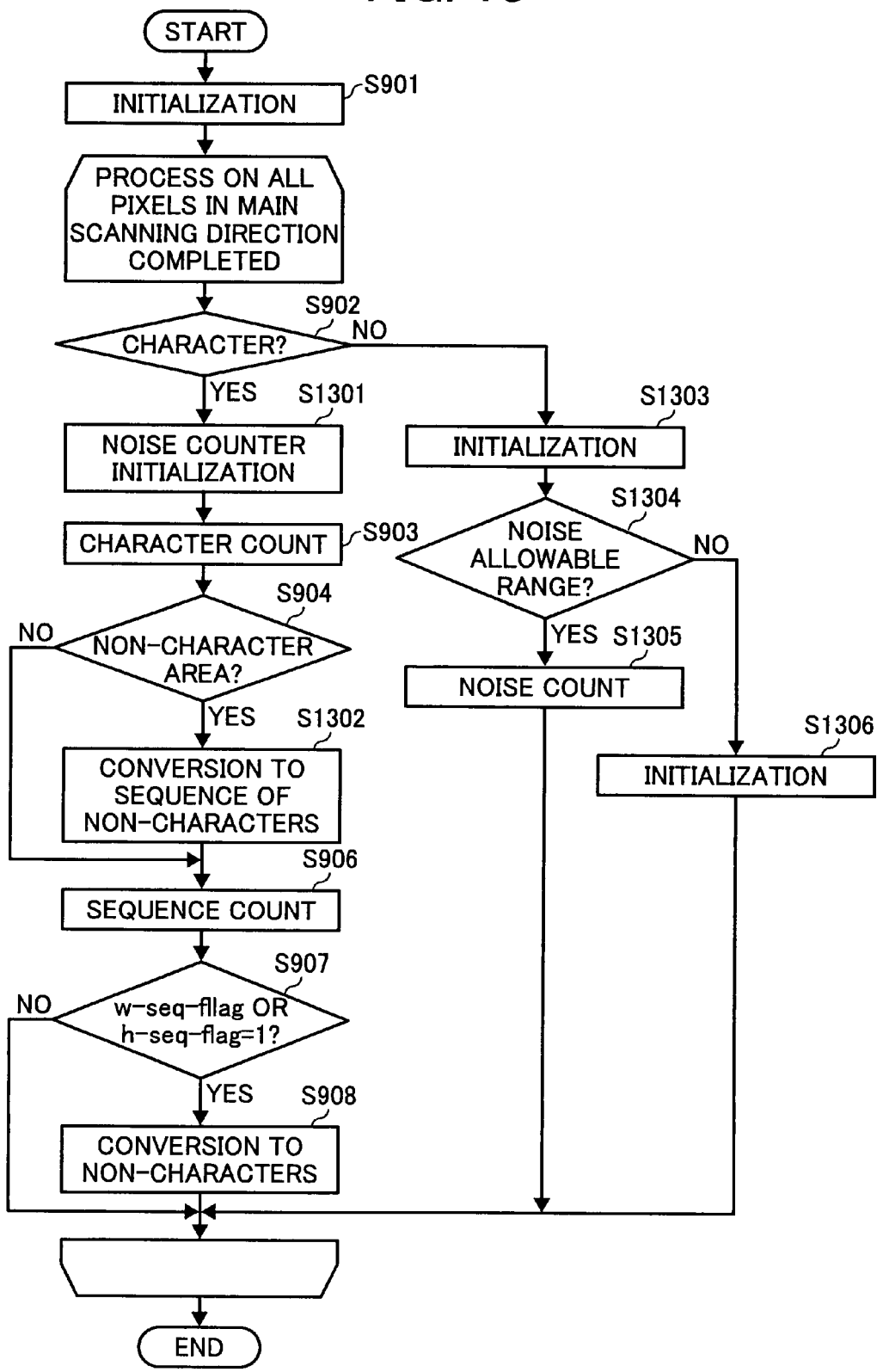
FIG. 13 is a flowchart of a first character-correction process according to a second embodiment of the present invention.

FIG. 13 is a flowchart of a first character-correction process according to the second embodiment.

In the following, a non-character pixel obtained by the binarizing unit 509a is explicitly referred to as "a non-character as a result of binarization", and simply a non-character refers to a pixel determined as a non-character through this first character-correction process.

Variables in the explanation represent as follows:

block_w_count: a counter of a character as a result of binarization in a main scanning direction block_w_size: a predetermined maximum number of character pixels in the main scanning direction+1 (varied depending on image resolution)

SS[i]: a result of character correction on the previous line, where i represents a position of a pixel in the main scanning direction h_seq_flag: sequence flag in the main scanning direction w_seq_flag: sequence flag in a sub-scanning direction himoji_flag: a variable for storing information about whether there is an excess over the character width at the time of determining the target pixel hole_count: noise counter hole_size: noise allowable range (varied depending on image resolution)

The counter is initialized as follows (step S901): block_w_size is substituted into block_w_count h_seq_flag, w_seq_flag, himoji_flag, an SS[i] are cleared to 0

The counters block_w_count and hole_count are assumed herein to be of decrement-type counters that set the maximum number of character pixels.

If the target pixel has been determined as a character by the binarizing unit 509a (Yes at step S902), the process control goes to step S1301. Otherwise, the process control goes to step S1303.

Noise counter hole_count is initialized to hole_size (step S1301). If a character counter indicates a value greater than 0 (step S903), block_w_count is decremented. If block_w_count indicates 0, the area is regarded as a non-character area with the target pixel taken as an end pixel (Yes at step S904), and the process control goes to S1302 for conversion to a sequence of non-characters.

If block_w_count indicates 0, set himoji_flag=1. Otherwise, set himoji_flag=0. If block_w_count indicates a value other than 0, the process control goes to step S906.

With the target pixel being taken as a right end, pixels as many as the number indicated by block_w_size in the main scanning direction are converted to non-characters (step S1302). Because pixels regarded as noise are regarded as non-characters, a process of converting to a non-character is not required.

If the previous-line pixel or the previous pixel is a non-character (step S906), w_seq_flag and h_seq_flag are set to "1". If w_seq_flag or h_seq_flag indicates 1, the target pixel is converted to a non-character (step S908).

This process is performed, as shown in FIG. 20, when the pixel on the previous line located at the same pixel position as the target pixel or the previous pixel on the target line is determined as a non-character, even if a sequence of pixels does not exceed the maximum character width in the main scanning direction.

Also, in the second embodiment, the process is performed when the pixel on the previous line located at the same pixel position as the target pixel or the previous pixel on the target line is determined as a non-character. Alternatively, the process may be performed as required when both pixels are determined as non-character. Still alternatively, a condition can be added that the pixel on the previous line located at the same position as the previous pixel of the target pixel is determined as a non-character.

The counter is initialized as follows (step S1303):

h_seq_flag and w_seq_flag are cleared to 0

Also, it is assumed that the target pixel when this process is performed is taken as a character pixel as a result of the first character correction. This result is referred to in character determination at the subsequent stage.

In the second embodiment, as explained below, the condition for character pixel is that the output result obtained by the binarizing unit 509a indicates "character". Therefore, even if a correction is made to a "character" pixel as a result of the first character correction based on this step S1303, the pixel is not determined as a character pixel eventually. However, this is not the case for an embodiment in which the determination condition of character determination at the previous pixel is changed.

Figure 23:
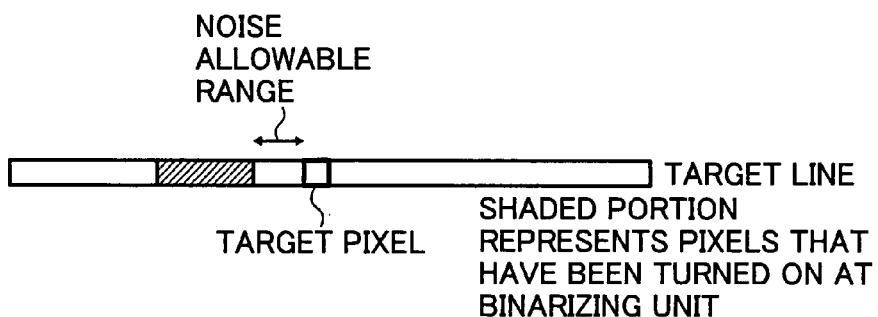
FIG. 23 is a schematic diagram for explaining an example in which a line of pixels with a target pixel as an end pixel exceeds a noise allowable range according to the second embodiment.

If hole_count indicates 0 (Yes at step S1304), which means that a line of pixels with the target pixel being taken as an end pixel exceeds a noise allowable range (refer to FIG. 23), the process control goes to step S1305. If hole_count indicates a value other than 0, the process control goes to step S1306.

Even if the result obtained by the binarizing unit 509a is 0, this may be due to the influence of noise. Therefore, instead of determining whether this is due to the influence of noise individually, as explained below, a noise counter is decremented to proceed to the next pixel. Furthermore, hole_count is decremented (step S1305).

Initialization is performed when pixels becoming 0 by the binarizing unit 509a continue in the main scanning direction by the value indicated by hole_count (step S1306). It is determined that this is not due to the influence of noise, and the counter is then initialized. block_w_count is set at block_w_size, and himoji_flag is cleared to 0.

According to the second embodiment, the counter and variables for determination about whether conversion to non-character is performed as explained in the first embodiment are not initialized based on only the data of a small number of pixels, for example, data of only one pixel. With this, durability against image noise is increased.

A third embodiment of the present invention is explained below. The third embodiment is different from the first and second embodiments only in a character-correction process performed by the character determining unit 509c. Therefore, the configuration and processes of the other units (including the character determination process performed by the character determining unit 509c) are not explained.

Figure 24:
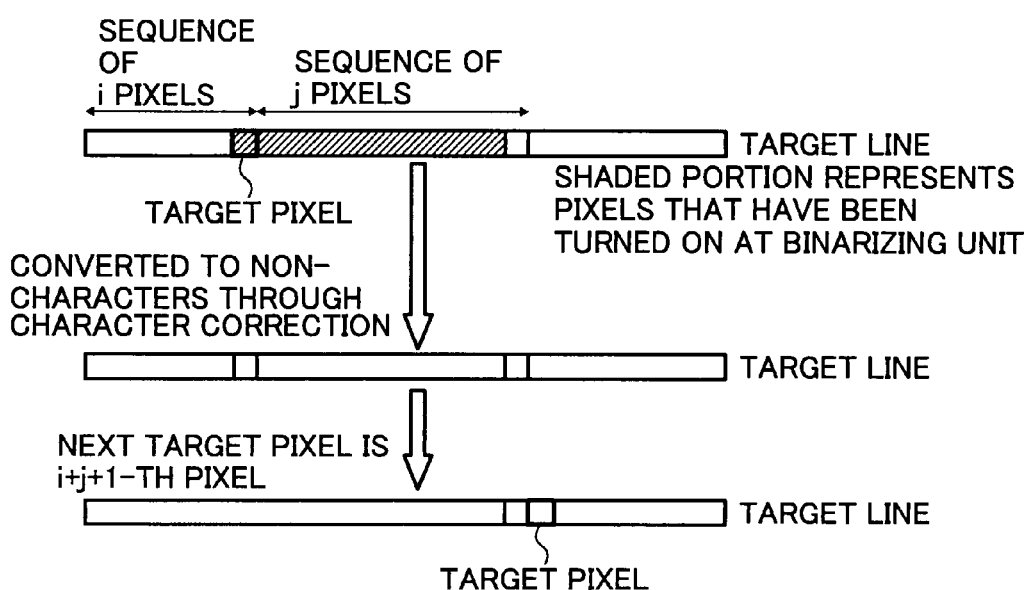
FIG. 24 is a schematic diagram for explaining a character-correction process according to the third embodiment by graphics.
Figure 25:
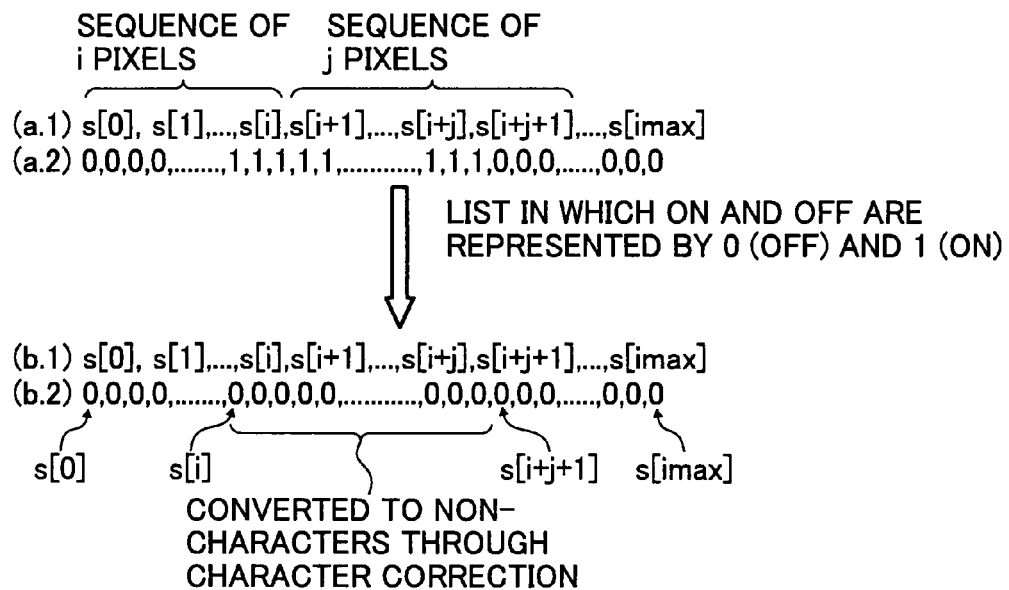
FIG. 25 is a schematic diagram for explaining the character-correction process according to the third embodiment by sequences.
Figure 26:
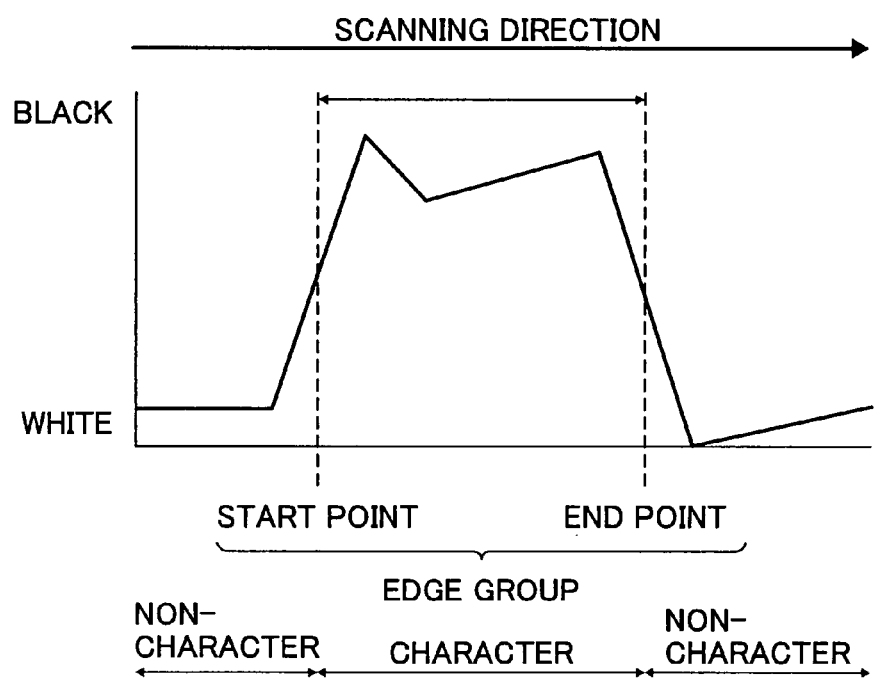
FIG. 26 is a schematic diagram for explaining a process of extracting a character area based on an edge group according to a conventional technology.

FIG. 24 is a schematic diagram for explaining the character-correction process by using graphics. FIG. 25 is a schematic diagram for explaining the character-correction process by using a list of variables.

The character determining unit 509c according to the third embodiment corrects a character pixel sequence starting at the target pixel as shown in FIG. 24 to a non-character pixel. This is depicted in a second state in FIG. 24. However, this process is performed when the number of pixels in a character pixel sequence exceeds a predetermine threshold, and if the number does not exceed the threshold, this process is not performed (a process when the number does not exceed the threshold is omitted in FIG. 24).

The third embodiment is different from the first and second embodiments in the following two points.

In character correction according to the third embodiment, the next target pixel after one process is not an adjacent pixel, but is always a pixel next to the last pixel with the result obtained by the binarizing unit 509a being "off". This is depicted by a third state in FIG. 24.

Also, this character correction does not take a scheme of performing a process in a forward direction and a backward direction in the main scanning direction, as is the case in the first and second embodiment. This is because, algorithmically, the end of a pixel sequence (for example, a left end if in a forward direction with respect to the main scanning direction) to be subjected to character correction are not left uncorrected to non-characters.

The target line to be subjected to character correction are considered to be a collection of elements, which are the results of the binarizing unit 509a in binary representation of "on" or "off" for a pixel on the target line. Therefore, representation can be made as an array with the position of the pixel as an index number (subscript) and with a Boolean-type variable as an element. When this array is taken as "s", s[i] represents an i-th pixel in the main scanning direction, and s[i] indicates a value of the binarization result ("on" or "off" or "0" or "1"). Therefore, a process in which a pixel s[i] is corrected from a character pixel to a non-character pixel can be represented by such that the value of s[i] is changed from 1 to 0.

As shown in FIG. 25, in this character correction, when "j" exceeds a predetermined threshold "thd", values from s[i] to s[i+j] are changed to 1 to 0. In FIG. 25, (a.1) and (b.1) represent an array of elements on the target line, (a.2) represents one example of values of the array before character correction, and (b.2) represents values of the array after correction.

Figure 14:
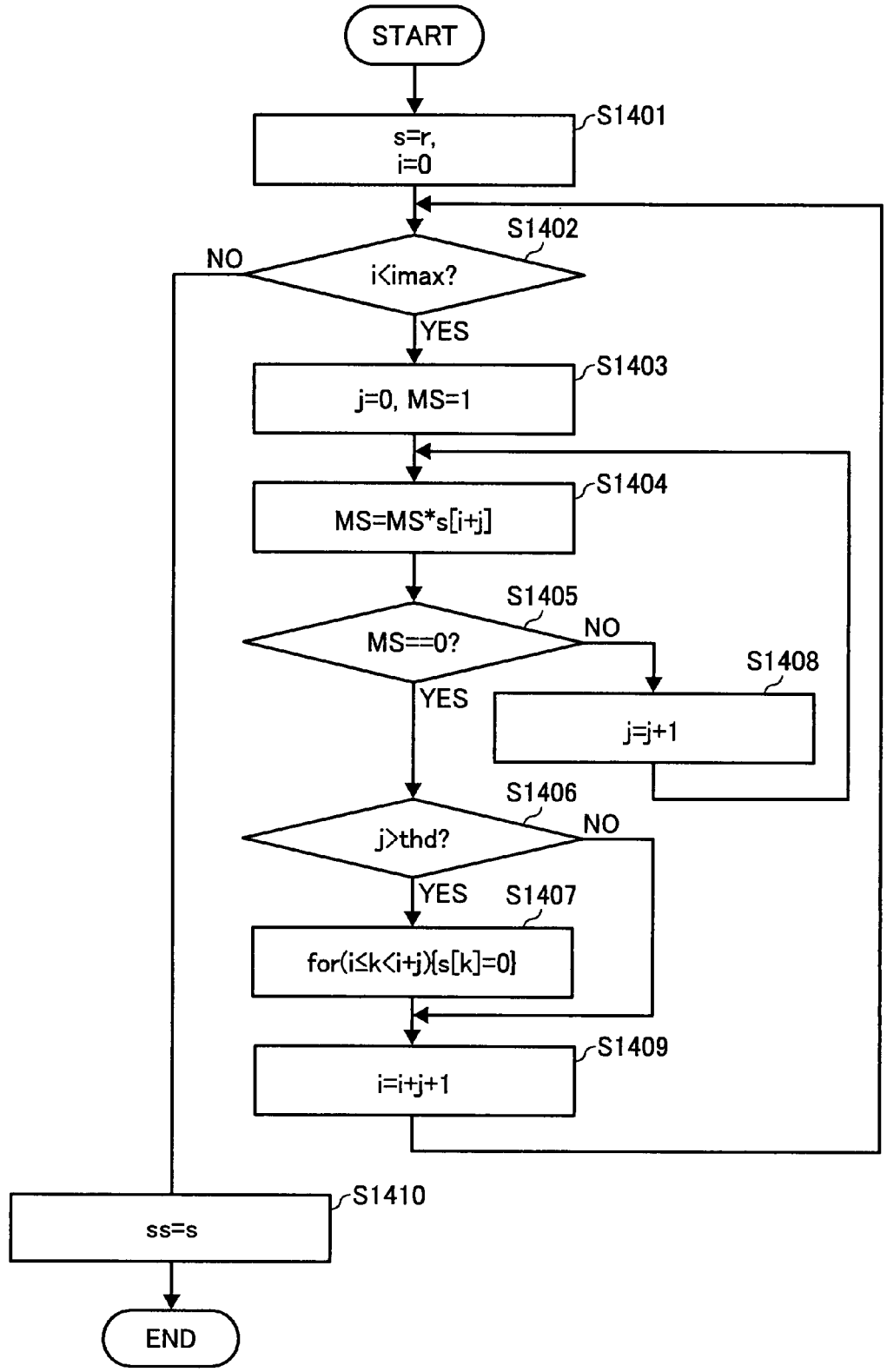
FIG. 14 is a flowchart of a character-correction process according to a third embodiment of the present invention.

FIG. 14 is a flowchart of the character-correction process according to the third embodiment.

Variables and operators used in FIG. 14 are defined as follows:

=, ==, =<, <, *, for: operators, where = is an assignment operator, ==, =<, < are comparison operators, * an operator for finding a product, and "for" configures a conditional statement for a repeat operation. The usage of these operators is the same as that in a general programming language.

i, j, k: integers, where "i" indicates a pixel position, "j" and "k" are process variables and do not particularly have meaning.

s, ss, r: arrays, any of which indicates a one-dimensional array with Boolean-type elements, where "s" represents an array eventually representing the process result of a character correction "c" on the target line, "ss" represents an array representing the process result of the character correction "c" on the previous line of the target line, and "r" represents an array representing the result obtained by the binarizing unit 509a on the target line. The element of any array is a pixel considered to be a character if indicating 1 (true) and a non-character if indicating 0 (false).

MS: a state variable, which can be of a Boolean type. This is a process variable and do not particularly have meaning. However, in the third embodiment, as long as the value of MS indicates 1 (true), the result obtained by the binarizing unit 509a for the adjacent pixel indicates 1 (true).

imax: a constant indicating a maximum value that can be taken by a pixel position "i". For example, when an A4 sheet is vertically read by 1200 dots per inch, 10500 pixels are aligned in a row and "i" is assumed to start with 0. Therefore, imax indicates 10499. As a matter of course, this value is varied depending on resolution and sheet size.

thd: a constant. If pixels determined by the binarizing unit 509a as character pixels continue as exceeding this threshold, these pixels are not considered as character pixels.

Before the character correction "c" is performed on the target line, variables are initialized (step S1401).

Specifically, s=r and i=0 are set, and "s" can be set at an undefined value before setting of s=r. Although "i" indicates an index number of an array s, "i" also indicates the pixel position of the target pixel on the target line, and therefore, "i" may start with 1.

Since the position of the target pixel does not come at a position exceeding "imax", if a condition "i<imax" is not satisfied (No at step S1402), the process on the current target line is completed. The process control exits the loop to go to step S1410 as a post process. If the condition is satisfied (Yes at step S1402), the process control goes to step S1403.

As initialization in loop, "j" and "MS", which are process variables, are initialized (step S1403). Since these are local variables, they do not have to be initialized at step S1401. The process control then goes to step S1404.

A sequence determination process is performed at steps S1404 and S1405. In the third embodiment, for determining a sequence of pixels, in view of the fact that the binary result is represented by a true or false value, the product of a true or false value from the target pixel to a pixel away from the target pixel by "j" is taken. If all pixels from "i" to "i+j" indicate true (1), the product of these true or false values is true (1).

If the process variable "MS" representing the state indicates 0 (Yes at step S1405), s[i+j] indicates a pixel for which the result obtained by the binarizing unit 509a indicates "non-character". If "MS" indicates 1 (No at step S1405), the value of "j" is incremented to repeat the process from step S1404.

The processes at steps S1404, S1405, and 1408 are repeated until "MS" becomes 0, and therefore, the pixels from s[i] to s[i+j−1] are pixels for all of which the result obtained by the binarizing unit 509a represents "character".

Through the processes at steps S1404, S1405, and S1408, a single character pixel sequence can be extracted. Next, from this sequence, a sequence that is too long as a character is extracted and is then converted to a non-character. In the processes at steps S1404, S1405, and S1408, the process variable "j" is incremented, and the length of a single character pixel sequence is stored. Then, the length is compared with the threshold thd (step S1406).

If "j>thd" is not satisfied (No at step S1406), this single character pixel sequence is considered to be a true character pixel. The process control goes to step S1409. If "j>thd" is satisfied (Yes at step S1406), the process control goes to step S1407 to convert the pixel sequence to non-characters.

To convert the sequence to non-characters (step S1407), the true or false value of a pixel for which the result obtained by the binarizing unit 509a indicates true is reversed. Through the processes at steps S1404, S1405, and S1408, the length of the pixel sequence has been stored in the process variable "j", and the end pixel of this pixel sequence is located at "i". Therefore, true or false values of the pixels from i to i+j are reversed (that is, set to be false). For k where i≦k<i+j, s[k]=0 is set. After this process of conversion to non-characters, the process control goes to step S1409.

To find the end pixel of the next pixel sequence, the value of "i" is incremented to the next pixel at the pixel position where a non-character pixel has been found lastly at step 1404 (step S1409).

Then, a series of process from step S1403 to step S1409 is repeated until the condition at step S1402 is not satisfied to exit the loop (No at step S1402).

Exiting the loop means that the character-correction process on the target line has been completed. Therefore, the next line becomes the target line, and ss=s is set as post process (step S1410). For use of the character correction result regarding the previous line, the process at step S1410 is essential.

The character-correction process according to the third embodiment is now summarized.

The binarizing unit 509a provides information as materials for character correction determination (image data binarized based on the density of the image data) to the character determining unit 509c that performs the character-correction process.

Therefore, the binarizing unit 509a functions as a binarizing unit that binarizes image data based on density of the image data and a determining unit that takes a pixel of dense output of the image data as a character pixel and a pixel of light output thereof as a non-character pixel.

Then, in the processes at steps S1403, S1404, S1405, and S1408, the character determining unit 509c counts the number of a sequence of pixels in the scanning direction converted by the binarizing unit 509a to character pixels. Also, in the processes at steps S1406 and S1407, when the counted number of a sequence of character pixels "j" exceeds the predetermined threshold "thd", the character pixels are corrected to non-character pixels.

Therefore, the character determining unit 509c functions as a counting unit that counts the number of a sequence of pixels determined by the determining unit as character pixels that are continued in the scanning direction and a first character correcting unit that performs correction in which, when the number of a sequence of character pixels counted by the counting unit exceeds a predetermined first threshold value, the character pixels are converted to non-character pixels.

As described above, according to the third embodiment, whether to perform conversion to non-character can be determined as long as binarized data based on density information of the target line is retained. Also, the sequence that does not exceed the maximum number of pixels under character specifications is not taken as characters. Therefore, a memory-saving character area determination can be made without depending on edge information including edge group information or losing a character area to the extent possible.

The end pixel of a pixel sequence to be converted to non-characters is converted to a non-character. Therefore, there is no need to perform a similar process twice in forward and backward direction with respect to the main scanning direction. Thus, the time taken for processing can be further reduced.

Incidentally, "r" can be a one-dimensional array "r", which is an element of a two-dimensional array "R" having stored therein the result obtained by the binarizing unit 509a. For example, with R[I]=r, an index number I of R represents the position of the target line in the sub-scanning direction. In this case, however, a two-dimensional array has to be provided and a relatively large memory space has to be ensured. This may invite an increase in the size of the apparatus.

Besides, a character-correction process can be performed by using not only the binarization result regarding the target line but also the binarization result and the character correction result regarding a line previous to the target line (hereinafter, the previous line).

For example, if character pixels continue from the target line, even if the number of a sequence does not exceed the predetermined threshold "thd", the pixels of the pixel sequence including the target pixel are converted to non-characters as long as the binarization result and the character correction result regarding the pixel near the target pixel satisfy a predetermined condition.

Specifically, a determination based on such a predetermined condition is made in the course of the process from No at step S1406 to step S1409 in FIG. 14.

As an example of the predetermined condition to be satisfied by the binarization result and the character correction result regarding the pixel near the target pixel, the following two conditions are simultaneously satisfied:

Character pixels of a sequence that are continued with the target pixel as the end and pixels of a sequence on the previous line at the same position in the main scanning direction have all been determined as character pixels Pixels of a sequence on the previous line have all been corrected to non-character pixels The schematic configuration of a process program for the process defined as above is explained below.

In the course of No at step S1406 to step S1409 in FIG. 14, when "i" and "j" satisfies the following conditional expression, s[i] to s[i+j] are corrected to non-character pixels.

$$ss[i]\cdot ss[i+1]\cdot \ldots \cdot ss[i+j]==1$$

Correction to non-character pixels is the same as previously described for step S1407 of FIG. 14, and therefore, is not explained.

In the above example, the character determining unit 509c functions as a second character correcting unit that corrects, when the target pixel is determined as a character pixel, a pixel sequence including the target pixel to a non-character pixel based on an arrangement of pixels on a target line and a line immediately before the target line, the pixels corrected to non-character pixels by the first character correcting unit.

The result of character area determination is propagated in the sub-scanning direction. Therefore, in addition to local information, a wide range of information is utilized, thereby increasing reliability and avoiding local dependency. Still further, the results of the character area determination regarding not only the target line but also the previous line are used, thereby detecting a non-character area elongated in a sub-scanning direction with a memory-saving configuration.

As set forth hereinabove, according to an embodiment of the present invention, for extraction without depending on edge information or losing a character area to the extent possible, a determination is made based on density information instead of initial selection with edge information. Furthermore, only what is required to be retained in memory is the output result regarding the previous line. Therefore, a memory-saving character area determination can be made without depending on edge group information or losing a character area to the extent possible.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a binarizing unit that binarizes image data based on density of the image data to obtain binarized image data;
a determining unit that determines a pixel with high density as a character pixel and a pixel with low density as a non-character pixel in the binarized image data;
a first counting unit that counts number of a sequence of character pixels in a scanning direction;
a second counting unit that counts number of a sequence of non-character pixels in the scanning direction while the first counting unit is counting the number of the sequence of character pixels; and
a first correcting unit that corrects, when the number of the sequence of the character pixels exceeds a first threshold value, the character pixels to the non-character pixels,
wherein the first counting unit continues counting when the number of the sequence of the non-character pixels is less than a second threshold value.

2. The image processing apparatus according to claim 1, further comprising a second correcting unit that corrects a target pixel determined as a character pixel to a non-character pixel based on an arrangement of pixels on a target line and a line immediately before the target line, which the first correcting unit has corrected to non-character pixels.

3. The image processing apparatus according to claim 2, wherein the second correcting unit corrects the target pixel to a non-character pixel when the first correcting unit has corrected a pixel adjacent to the target pixel to a non-character pixel.

4. The image processing apparatus according to claim 1, further comprising:
   a gray area detecting unit that detects an area with intermediate density in the image data; and
   a dot detecting unit that detects a dot area in the image data, wherein
   the first correcting unit corrects the character pixels based on at least one of a detection result obtained by the gray area detecting unit and a detection result obtained by the dot detecting unit.

5. The image processing apparatus according to claim 1, further comprising an edge detecting unit that detects an edge pixel in the image data, wherein
   the first correcting unit corrects the edge pixel to a character pixel.

6. An image forming apparatus comprising:
   the image processing apparatus according to claim 1;
   an image forming unit that forms an image based on image data output from the image processing apparatus; and
   an image output unit that outputs the image.

7. An image distributing apparatus comprising:
   the image processing apparatus according to claim 1;
   a scanning unit that scans an image while separating the image into color components, generates image data, and feeds the image data to the image processing apparatus; and
   a communicating unit that distributes the image data processed by the image processing apparatus over a network.

8. An image processing method performed by an image processing apparatus, the method comprising:
   binarizing, by a binarizing unit, image data based on density of the image data to obtain binarized image data;
   determining, by a determining unit, a pixel with high density as a character pixel and a pixel with low density as a non-character pixel in the binarized image data;
   first counting, by a first counting unit, number of a sequence of character pixels in a scanning direction;
   second counting, by a second counting unit, number of a sequence of non-character pixels in the scanning direction while the number of the sequence of character pixels is being counted; and
   first correcting, by a first correcting unit, when the number of the sequence of the character pixels exceeds a first threshold value, the character pixels to the non-character pixels,
   wherein the first counting includes continuing counting when the number of the sequence of the non-character pixels is less than a second threshold value.

9. The image processing method according to claim 8, further comprising:
   second correcting, by a second correcting unit, a target pixel determined as a character pixel to a non-character pixel based on an arrangement of pixels on a target line and a line immediately before the target line, which has been corrected to non-character pixels at the first correcting.

10. The image processing method according to claim 9, wherein the second correcting includes correcting the target pixel to a non-character pixel when a pixel adjacent to the target pixel has been corrected to a non-character pixel at the first correcting.

11. The image processing method according to claim 8, further comprising:
    first detecting, by a first detecting unit, an area with intermediate density in the image data; and
    second detecting, by a second detecting unit, a dot area in the image data, wherein
    the first correcting includes correcting the character pixels based on at least one of a detection result obtained at the first detecting and a detection result obtained at the second detecting.

12. The image processing method according to claim 8, further comprising:
    detecting, by an edge detecting unit, an edge pixel in the image data, wherein the first correcting includes correcting the edge pixel to a character pixel.

13. A non-transitory computer-readable medium that stores computer readable program codes embodied in the non-transitory computer-readable medium that when executed causes the image processing apparatus to implement the image processing method according to claim 8.

14. A computer program product comprising a non-transitory computer readable medium having computer readable program codes embodied in the non-transitory computer readable medium that, when executed, causes a computer to execute:
    binarizing image data based on density of the image data to obtain binarized image data;
    determining a pixel with high density as a character pixel and a pixel with low density as a non-character pixel in the binarized image data;
    first counting number of a sequence of character pixels in a scanning direction; and
    second counting number of a sequence of non-character pixels in the scanning direction while the number of the sequence of character pixels is being counted; and
    correcting, when the number of the sequence of the character pixels exceeds a first threshold value, the character pixels to the non-character pixels,
    wherein the first counting includes continuing counting when the number of the sequence of the non-character pixels is less than a second threshold value.

* * * * *

UNITED STATES PATENT AND TRADEMARK OFFICE
CERTIFICATE OF CORRECTION

| | | |
|---|---|---|
| PATENT NO. | : 7,986,837 B2 | Page 1 of 1 |
| APPLICATION NO. | : 11/776928 | |
| DATED | : July 26, 2011 | |
| INVENTOR(S) | : Aoki | |

It is certified that error appears in the above-identified patent and that said Letters Patent is hereby corrected as shown below:

Title page add:

Item (30) Foreign Application Priority Data

July 12, 2006  (JP)...............2006-192211

Signed and Sealed this
Thirty-first Day of January, 2012

David J. Kappos
*Director of the United States Patent and Trademark Office*